United States Patent [19]

Ishizaka

[11] Patent Number: 5,765,009
[45] Date of Patent: Jun. 9, 1998

[54] BARRIER SYNCHRONIZATION SYSTEM IN PARALLEL DATA PROCESSING

[75] Inventor: Kenichi Ishizaka, Kawasaki, Japan

[73] Assignee: Fujitsu Limited, Kawasaki, Japan

[21] Appl. No.: 779,493

[22] Filed: Jan. 8, 1997

Related U.S. Application Data

[63] Continuation of Ser. No. 378,749, Jan. 26, 1995, abandoned.

[30] Foreign Application Priority Data

Feb. 22, 1994 [JP] Japan .................................. 6-024065

[51] Int. Cl.⁶ .................................................. G06F 15/16
[52] U.S. Cl. ..................... 395/800; 395/309; 395/839; 364/229; 364/229.3; 364/DIG. 1
[58] Field of Search .................... 395/800, 200.03, 395/200.09, 200.2, 309, 823, 828, 835, 837, 839; 340/825.5, 825.05, 825.52, 825.6, 825.8; 364/DIG. 1

[56] References Cited

U.S. PATENT DOCUMENTS

| | | | |
|---|---|---|---|
| 4,195,351 | 3/1980 | Barner et al. | 340/825.05 |
| 4,360,870 | 11/1982 | McVey | 395/829 |
| 4,569,041 | 2/1986 | Takeuchi et al. | 370/60 |
| 4,601,586 | 7/1986 | Bahr et al. | 395/474 |
| 4,773,038 | 9/1988 | Hillis et al. | 395/800 |
| 4,939,642 | 7/1990 | Blank | 395/800 |
| 4,998,245 | 3/1991 | Tanaka et al. | 370/85.1 |
| 5,039,980 | 8/1991 | Aggers et al. | 340/506 |
| 5,056,000 | 10/1991 | Chang | 364/200 |
| 5,117,420 | 5/1992 | Hillis et al. | 370/60 |
| 5,175,865 | 12/1992 | Hillis | 395/800 |
| 5,212,773 | 5/1993 | Hillis | 395/200.16 |
| 5,355,504 | 10/1994 | Nedwek | 395/800 |
| 5,365,228 | 11/1994 | Childs et al. | 340/825.8 |
| 5,434,995 | 7/1995 | Oberlin et al. | 395/550 |
| 5,452,419 | 9/1995 | Di Giulio et al. | 395/200.01 |
| 5,475,856 | 12/1995 | Kogge | 395/800 |
| 5,519,877 | 5/1996 | Yoneda et al. | 395/800 |

*Primary Examiner*—Meng-Ai T. An
*Attorney, Agent, or Firm*—Staas & Halsey

[57] ABSTRACT

A data parallel processing system is equipped with two or more processing elements. On termination of data processing, each processing element informs an interconnection device of it. The interconnection device produces serial data on the basis of information indicating a progress of data processing by each of processing elements connected to it and information about the placement and configuration of the processing elements, then broadcasts the serial data to each of the processing elements. At this point, serial data of the shortest length is produced in such a way that processing elements not connected to the interconnection device or not in a ready state are omitted.

21 Claims, 28 Drawing Sheets

FIG. 17

| BIT NUMBER | 0 ~ 9 | 10 ~ 19 | 20 ~ 29 | 30 ~ 39 | 40 ~ 49 |
|---|---|---|---|---|---|
| DATA | 1 ~ 1 | PE 0 ~ PE 7 PARITY 0 | PE 8 ~ PE 15 PARITY 0 | PE 16 ~ PE 23 PARITY 0 | PE 24 ~ PE 31 PARITY 0 |

| BIT NUMBER | 0 ~ 9 | 10 ~ 19 |
|---|---|---|
| DATA | 1 ~ 1 | PE 0 ~ PE 7 PARITY 0 |

FIG. 18

| BIT NUMBER | 0 ~ 9 | 10 ~ 19 | 20 21 22 ~ 28 29 |
|---|---|---|---|
| DATA | 1 ~ 1 | PE 0 ~ PE 7 PARITY 0 | PE 8 PE 9 PE 12 0 0 0 PARITY 0 |

FIG. 19

| BIT NUMBER | 0 ~ 9 | 10 ~ 19 |
|---|---|---|
| DATA | 1 ~ 1 | PE 0<br>PE 2<br>PE 8<br>PE 11<br>PE 14<br>PE 15<br>PE 30<br>PE 31<br>PARITY<br>0 |

FIG. 24

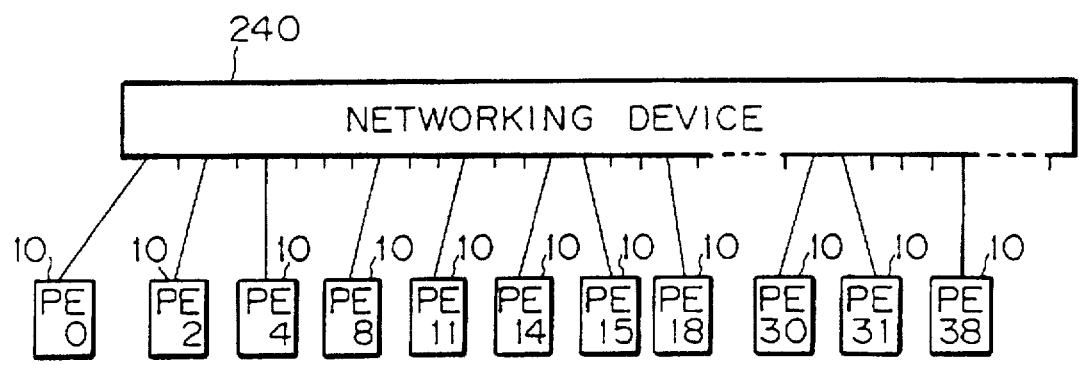

BARRIER SYNCHRONIZATION SYSTEM IN PARALLEL DATA PROCESSING

This application is a continuation of application Ser. No. 08/378,749, filed Jan. 26, 1995, now abandoned.

BACKGROUND OF THE INVENTION

1. Field of the Invention

The present invention relates to a parallel processing system which uses more than one processing element (PE) for parallel processing.

2. Description of the Related Art

Numerical simulation which conducts a numerical analysis of an object having a complex structure need an overwhelming amount of computation. Examples of the areas where numerical simulation is used include natural science, where simulation is used to study quantum science, life science, meteorology or global environment, and industry, where simulation is used as a design aid for aircraft and automobiles.

In order to reduce an amount of computing time required for simulation of such a complex system, parallel computer systems using parallel processing techniques are in increasing demand and have been studied and developed actively.

Among parallel computers there is a parallel computer in which multiple processing elements execute different portions of a program in parallel and, at the termination of the program execution, start processing another program.

With such a parallel computer, it is impossible to predict when the program processing will be terminated. For this reason, provision is made of a barrier synchronization facility 2 as shown in FIG. 1, which, when notified of the termination of execution of a program by all of processing elements 1-1 to 1-n (PE1 to PEn), broadcasts to each processing element a barrier sync (synchronization) signal which permits it to process the next program.

That is, the barrier synchronization facility 2 has an AND operation section built in, which receives PE status signals from all the processing elements PE1 to PEn, thereby detecting whether all the processing elements have terminated program processing. The AND operation section 8 generates that barrier synchronization signal and sends it to each of the processing elements.

FIG. 2 illustrates the way four processing elements PE1 to PE4 execute different portions of a program in parallel on the basis of barrier sync signals. As shown, when the four processing elements have all terminated the execution of portions A1, A2, A3 and A4 of a program A which are allotted for them, the barrier synchronization facility 2 sends a barrier sync signal to each of the processing elements. As a result, the processing elements PE1 to PE4 are permitted to start the execution of portions B1, B2, B3 and B4 of another program B. Next, a program C is executed on condition that the program B has terminated. Subsequently, a program D is executed on termination of the execution of the program C.

The barrier synchronization facility needs to be implemented with a small amount of hardware in order to check an increase in the amount of hardware in a parallel computer system.

Like the above programs A, B, C, and D, a series of programs which are allotted for a fixed number of processing elements (PE1 to PE4 in the illustrated example) for processing is generally called a program group.

In parallel processing, two or more program groups may be processed while they are executed independently and concurrently. In such a case as well, the barrier synchronization facility is required to generate barrier sync signals at correct times.

Such an example is illustrated in FIG. 3. In this example, a first program group comprising programs D, E, F, and J and a second program group comprising programs G and H are executed concurrently. The first program group is executed by processing elements PE1, PE2, and PE3, while the second program group is executed by processing elements PE4 and PE5.

In this case, in the first program group executed by the processing elements PE1, PE2, and PE3, the program E is run on condition that the execution of the program D (D1, D2, D3) is terminated, the program F (F1, F2, F3) is executed on termination of the execution of the program E, and the program J is executed on termination of the execution of the program F. In the second program group executed by the processing elements PE4 and PE5, the program H (H1, H2) is run on condition that the execution of the program G (G1, G2) is terminated.

In such a case, the barrier synchronization facility 2 is required to generate a barrier sync signal each time the three processing elements PE1, PE2 and PE3 terminate the execution of one of the programs D, E and F in the first program group.

Likewise, the barrier synchronization facility is required to generate a barrier sync signal each time the two processing elements PE4 and PE5 terminate the execution of one of the programs G and H in the second program group.

Hereinafter, a program group that is executed concurrently in a parallel computer system will be referred to as a barrier group for convenience of description.

FIG. 4 shows a barrier synchronization facility for generating such barrier sync signals as described above in a conventional data parallel processing system.

Processing elements 1-1 to 1-n (PE1 to PEn) execute programs in sequence in response to barrier sync signals from the barrier synchronization facility 2. Each processing element sends its PE status signal to the barrier synchronization facility to thereby inform the facility 2 of termination of the execution of a program portion allotted to it.

The barrier synchronization facility 2 comprises a PE status register 3, mask registers 4-1 to 4-k equal in number to barrier groups which are carried out concurrently on the processing elements 1-1 to 1-n, barrier sync signal generators 5-1 to 5-k having a one-to-one correspondence with the mask registers 4-1 to 4-k, and selectors 6-1 to 6-n having a one-to-one correspondence with the processing elements 1-1 to 1-n.

The PE status register 3 manages program-processing termination information sent from each processing elements 1-i. The mask register 4-j (j=1 to k) manages information (information of processing element names) on processing elements 1-i (i=1 to n) which are allotted for programs in a corresponding barrier group.

The barrier sync signal generator 5-j (j=1 to k) generates a barrier sync signal on the basis of management information in the PE status register 3 and management information in the corresponding mask register 4-j.

Though connection relationships are not fully shown in FIG. 4, a selector 6-i (i=1 to n) refers to management data in the mask registers 4-1 to 4-k and selects one of barrier sync signals input from the barrier sync signal generators 5-1 to 5-k to provide it to a corresponding processing element 1-i.

To be specific, the PE status register 3 operates in the following manner. That is to say, when the processing element 1-i does not inform the PE status register 3 of program processing termination, a logic "0" is entered into the corresponding entry field in the register. Upon receipt of the program processing termination information, the register 3 changes the contents of that entry field to a logic "1". In this way, the PE status register manages program processing termination information from the processing element 1-i. In the mask register 4-j, as shown in FIG. 5, logics "1" are entered into the entry fields for processing elements that execute programs in the corresponding barrier group and logics "0" are entered in the entry fields for processing elements which do not execute programs in the corresponding barrier group. In this way, name information or PE numbers of processing elements that execute programs in the corresponding barrier group is managed.

In the barrier synchronization facility 2 thus arranged, each barrier sync signal generator 5-j monitors the management data in the PE status register 3 to determine whether all the processing elements that have been specified in the corresponding mask register 4-j as executing programs in the same barrier group have terminated program processing. When it is confirmed that these processing elements have all terminated the program processing, the sync signal generator 5-j generates a barrier sync signal to each of the selectors 6-1 to 6-n. Upon receipt of the barrier sync signal, each selector 6-i outputs it to the processing element 1-i connected thereto if that barrier sync signal is issued from the barrier sync signal generator 5-j associated with the barrier group whose program is to be partially executed by that processing element 1-i.

With such an arrangement, however, the barrier synchronization facility 2 must be equipped with as many mask registers, each having the bit length corresponding to the number of processing elements used, as there are barrier groups. As described above, the amount of hardware used increases in proportion to the number of barrier groups. Thus, an increase in the number of barrier groups results in a serious problem. In addition, changes to the combination of barrier groups involve a change of the contents of mask registers. Therefore, a problem will arise in the case of a program which is required to make changes on the combination of barrier groups in that difficulties are involved in performing dynamic control.

SUMMARY OF THE INVENTION

It is an object of the present invention to provide a data parallel processing system which permits barrier sync signals to be generated with a small amount of hardware and is especially adapted to speed up barrier synchronization when a small number of processing elements are connected to a networking device.

The present invention is directed to a data parallel processing system which is equipped with an interconnection device (or networking device) which interconnects plural processing elements to permit them to perform data processing in parallel.

Each of the processing elements performs various computations for data processing allotted to it. On termination of that data processing, the processing element sends to the corresponding interconnection device information indicating the termination of the data processing.

The interconnection device accepts from each of the processing elements connected to it information indicating the progress of the allotted data processing and creates serial data as to the progress of data processing on the basis of that information and the placement and configuration of the processing elements.

The information on the placement and configuration of processing elements, indicating, for example, which of processing elements are connected to the interconnection device or which of processing elements connected are in the ready state, is entered into a register in the interconnection device beforehand. On the basis of this information, the progress of data processing by processing elements that are not connected or are not in the ready state can be ignored, which permits the length of the serial data to be made as short as possible.

The interconnection device broadcasts the serial data thus created to all the processing elements.

Each processing element holds in its register the same information as the processing element placement and configuration information that the interconnection device holds. Upon receipt of the serial data from the interconnection device, the processing element can know the progress of data processing by the other processing elements from the serial data and that information in its register and then determine the timing of starting of the next data processing.

If data processing needs too many processing elements, several interconnection devices can be interconnected in a loop configuration (ring configuration). In this case, plural processing elements will be connected to each interconnection device.

With this system configuration, each interconnection device broadcasts serial data to each of processing elements associated with it and transfers the serial data to the adjacent downstream interconnection device. At this point, each interconnection device adds the data processing progress information received from its associated processing elements to serial data received from its adjacent upstream interconnection device and transfers the serial data to its adjacent downstream interconnection device.

Thus, the serial data will contain information for all the processing elements on the loop, and each processing element is permitted to know the progress of data processing by all other processing elements.

In addition, each processing element may be connected to an interconnection device by plural transfer lines, and an interconnection device and the adjacent interconnection device may be connected together by plural transfer lines. If, in this case, the time for the transfer of the same serial data on each of the parallel transfer lines is staggered by a fixed period of time, then the serial data transfer through the loop will be further speeded up.

BRIEF DESCRIPTION OF THE DRAWINGS

One skilled in the art can easily understand additional features and objects of this invention from the description of the preferred embodiments and some of the attached drawings. In the drawings:

FIG. 17 is a diagram for use in explanation of a barrier data format;

FIGS. 18 and 19 show examples of barrier data produced by the first networking device;

FIG. 24 is a diagram for use in explanation of a format of barrier data produced by the third networking device;

FIG. 25 shows still another data parallel processing system;

FIG. 26 shows another format of barrier data produced by the third networking device;

DETAILED DESCRIPTION OF THE PREFERRED EMBODIMENTS

Figure 1:
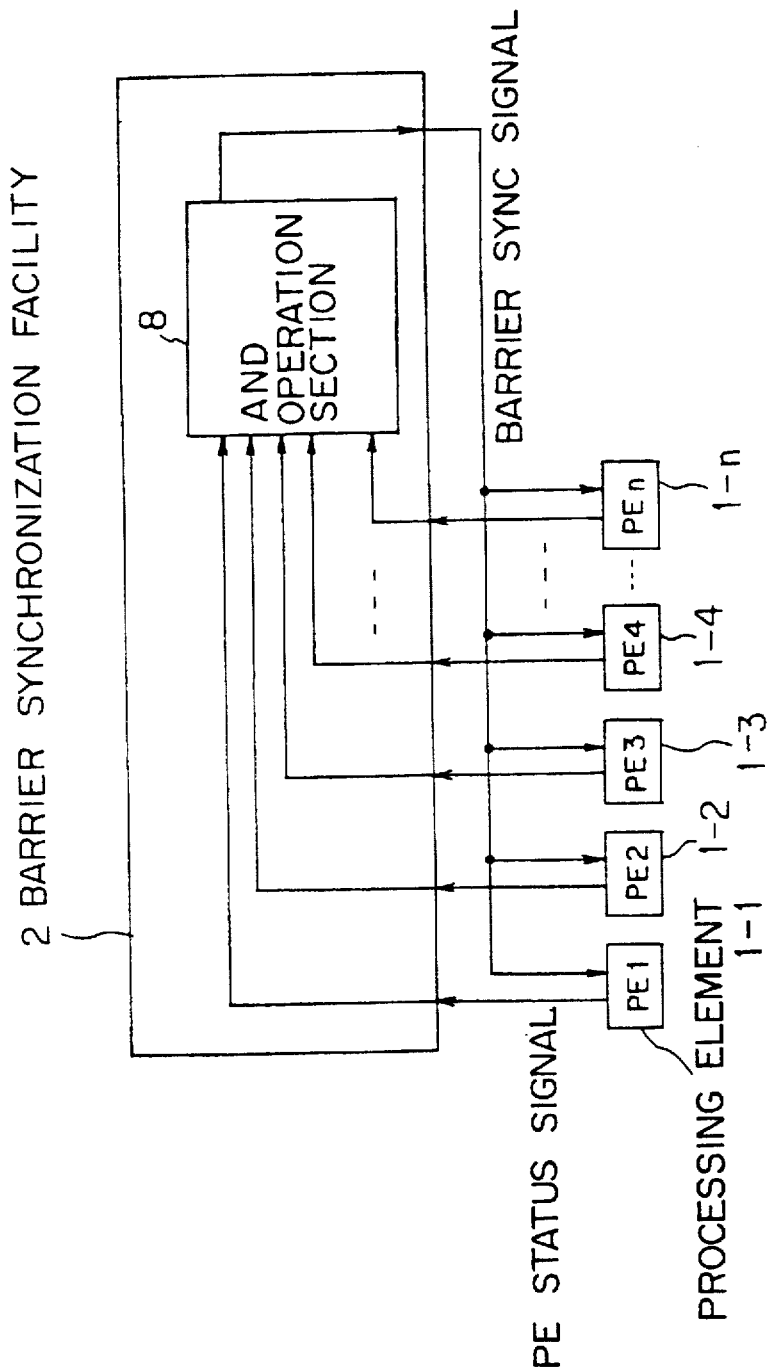
FIG. 1 is a diagram for use in explanation of a barrier synchronization facility.
Figure 2:
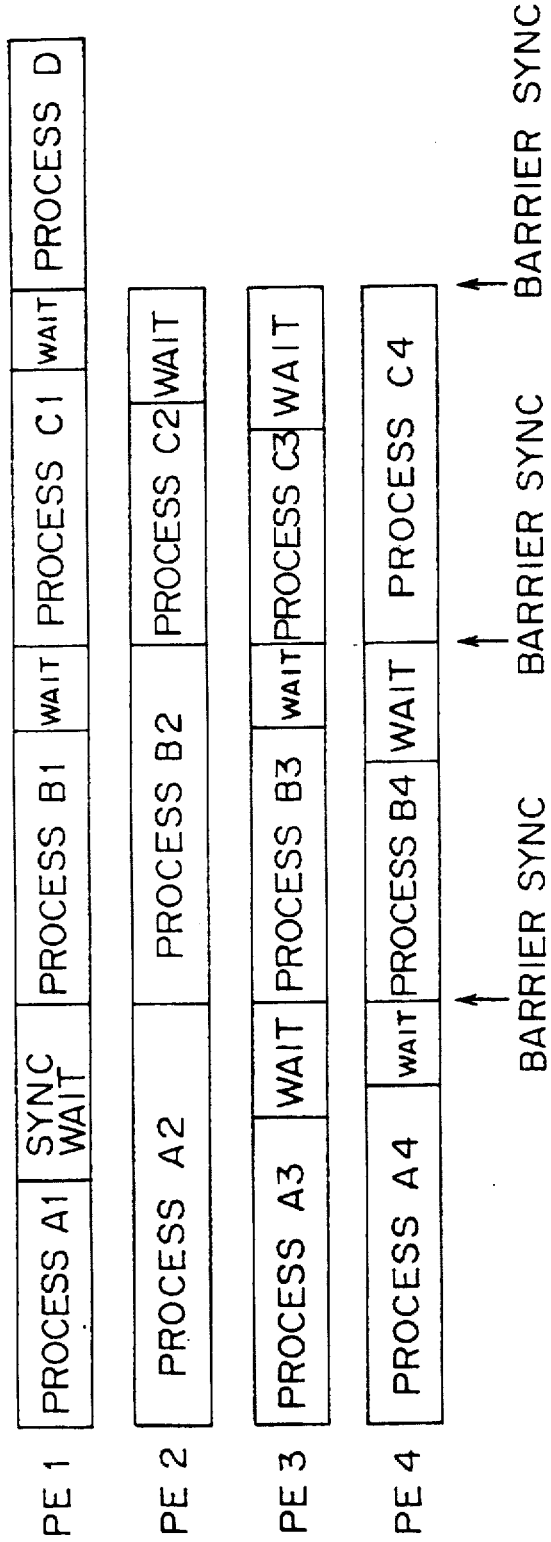
FIG. 2 is diagram for use in explanation of barrier synchronization processing.
Figure 3:
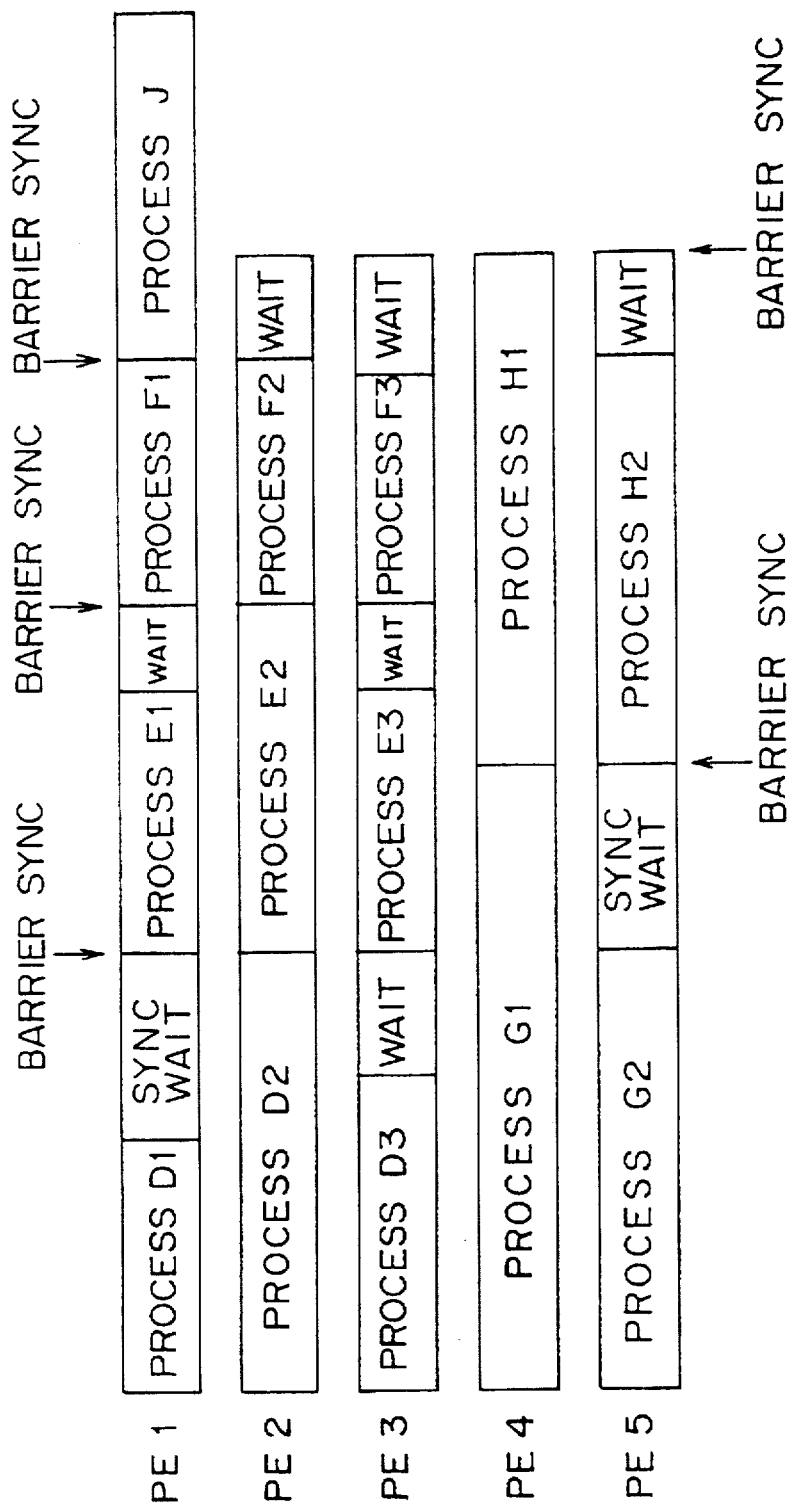
FIG. 3 is diagram for use in explanation of barrier synchronization processing.
Figure 4:
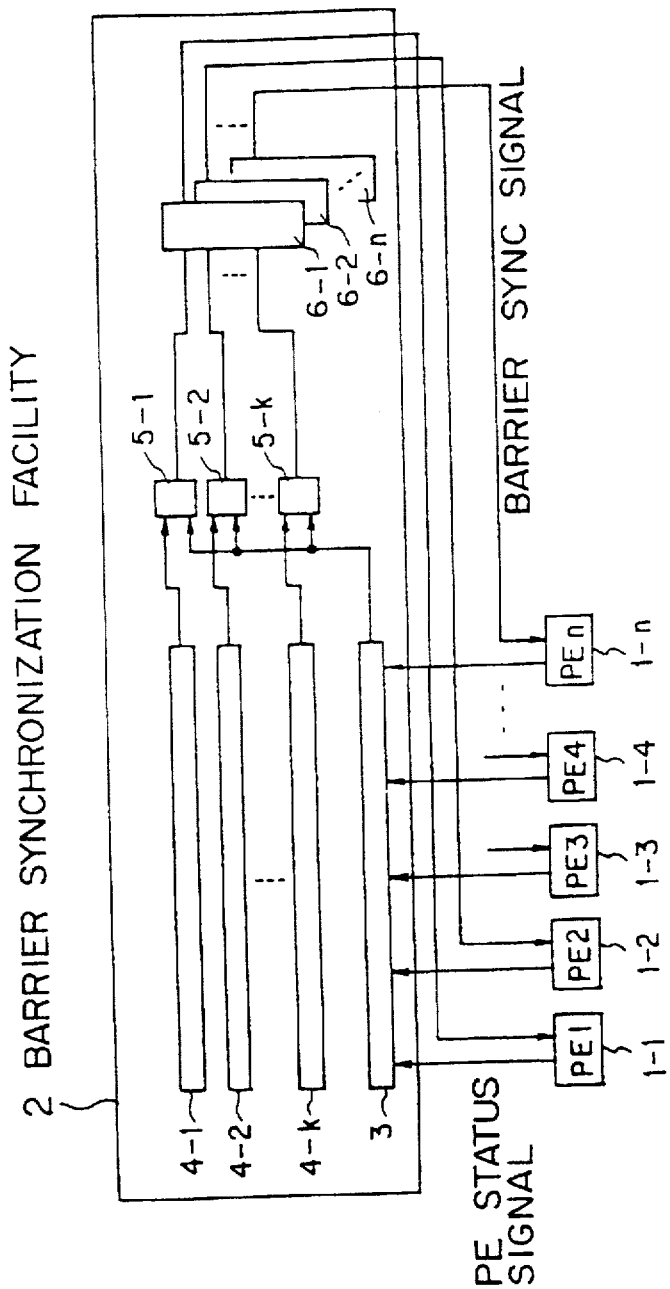
FIG. 4 shows a conventional data parallel processing system.
Figure 5:
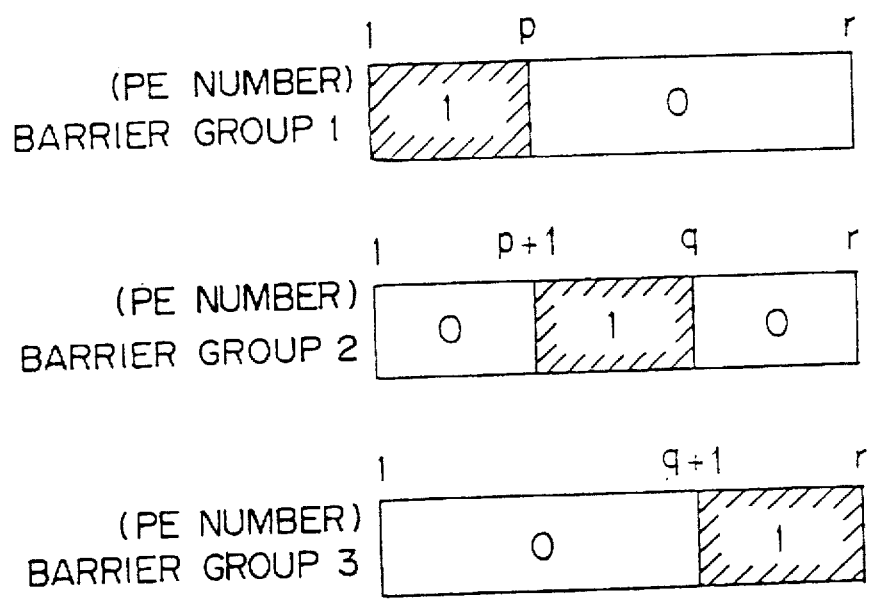
FIG. 5 shows the format of management data placed in the mask registers of FIG. 4.
Figure 6:
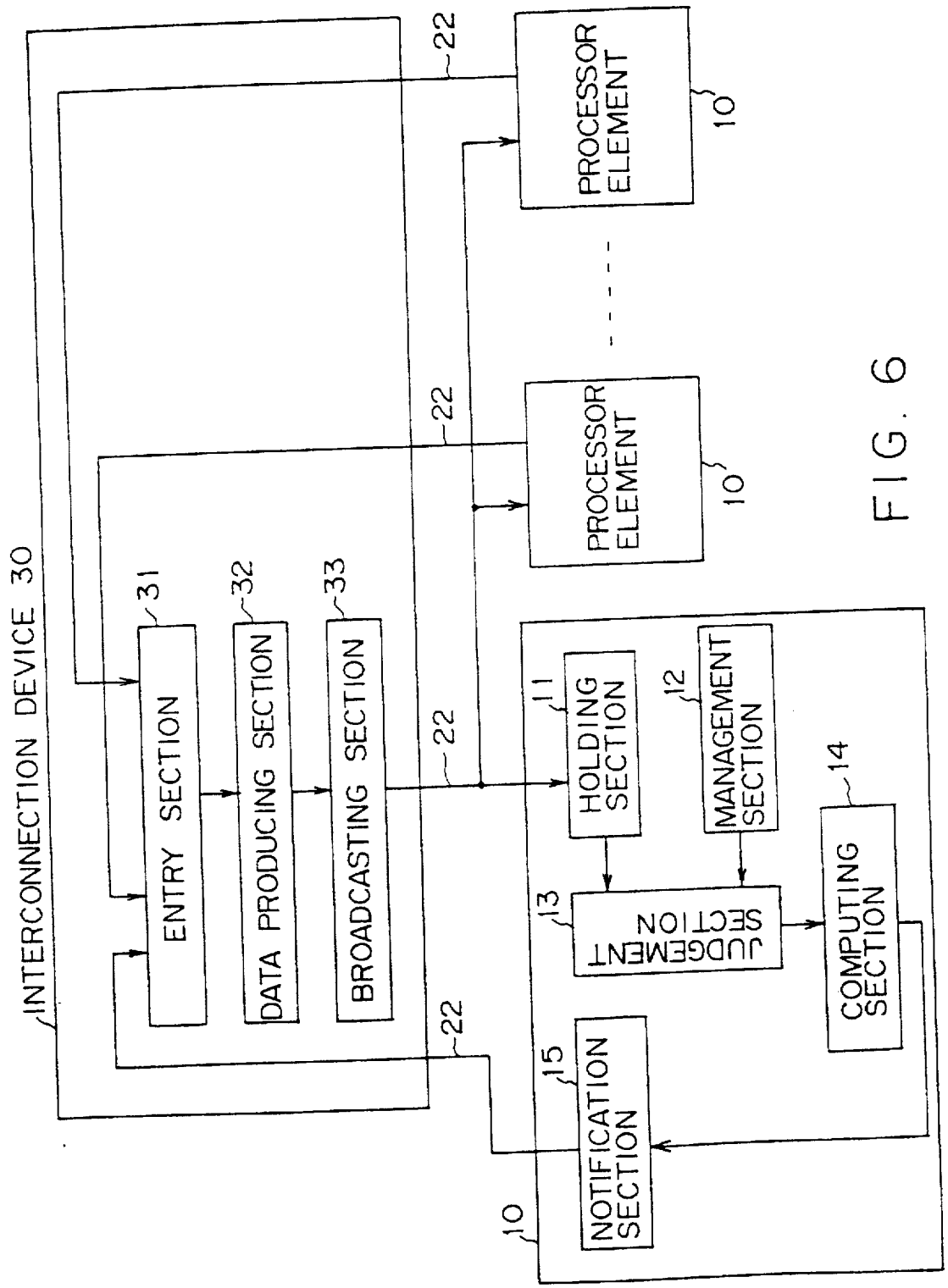
FIG. 6 shows a basic arrangement of an embodiment of the present invention.
Figure 7:
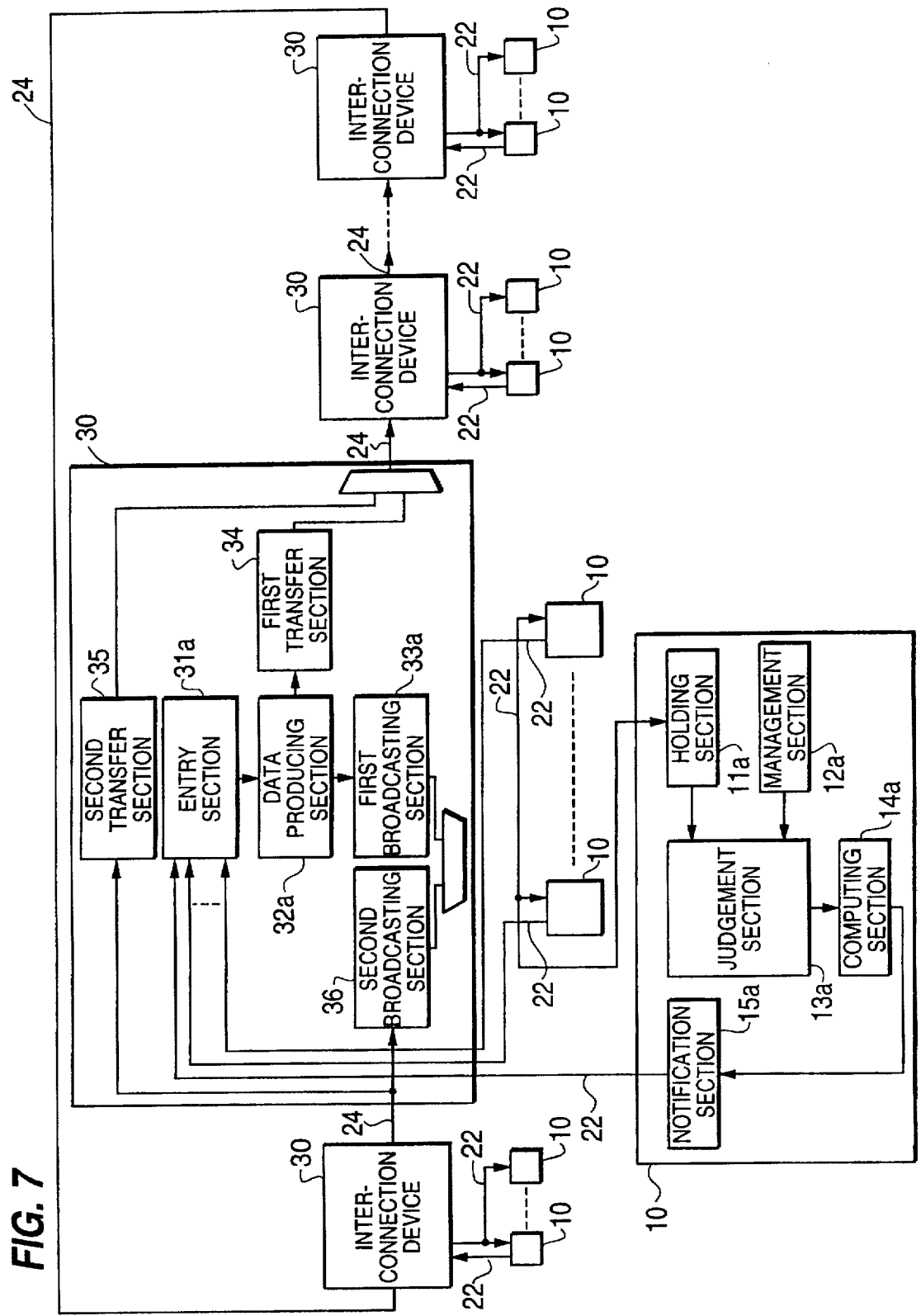
FIG. 7 shows a basic arrangement of an embodiment of the present invention which is equipped with more than one interconnection device.

FIGS. 6 and 7 are diagrams which are useful in understanding the principles of the present invention.

FIG. 6 shows a data parallel processing system which comprises plural processing elements 10 and an interconnection device 30 which interconnects the processing elements 10. In this parallel processing system, each processing element enters information indicating the progress of its data processing into the interconnection device 30. The interconnection device 30 broadcasts serial data, including information on the progress of data processing by all of the processing elements 10 which has been entered into the interconnection device 30, to each of the processing elements via a serial transfer line 22. The processing elements 10 are arranged into groups for parallel processing.

The interconnection device 30 includes an entry section 31, a data producing section 32, and a broadcasting section 33. The entry section 31 receives data processing progress information sent from each processing element connected thereto via a serial transfer line 22, whereby that information is entered. The data producing section 32 receives the data processing progress information for each of the connected processing elements from the entry section 31, then determines the format of serial data to be broadcasted to each processing element on the basis of the placement and configuration of the processing elements 10 connected to the interconnecting device and produces the serial data. The broadcasting section 33 broadcasts that serial data produced by the producing section 32 to each of the connected processing elements 10 via the serial transfer line 22.

Each processing element includes a holding section 11, a management section 12, a judgment section 13, a computing section 14, and a notification section 15. The holding section 11 holds the serial data sent from the interconnection device 30 over the serial transfer line 22. The management section 12 manages information on processing elements with which that processing element executes parallel processing. The judgment section 13 judges the progress of data processing on the basis of the contents of the serial data held by the holding section 11 and the management information in the management section 12. The computing section 14 performs various computations for data processing and determines the timing of starting of computation for the next data processing on the basis of the results of the judgment by the judgment section 13. The notification section 15 transmits data processing progress information indicating whether or not allotted data processing is terminated by that processing element to the interconnection device 30 as instructed by the computing section 14.

The data producing section 32 may produce that serial data on the basis of the placement and configuration of processing elements which are connected to the interconnection device 30 and are placed in the ready state.

The data producing section 32 may be equipped with a mode information holding section which holds information for specifying the format that serial data will take. The format of serial data to be produced will depend on the mode information. In this case, the mode information may be set in the mode information holding means by the use of a setting unit outside the interconnection device. The setting unit may be a processor. Alternatively, user-operable DIP switches may be used for the mode information setting.

The device numbers (PE numbers) of the processing elements 10 may be determined by their respective locations where they are connected to the interconnection device 30. In this case, the processing elements may be consecutively numbered starting with 0. The mode information may be determined in accordance with the highest device number of the processing elements 10 that are connected to the interconnection device 30. In this case, the data producing section 32 may determine the length of that serial data in accordance with the mode information thus determined. That is, since processing elements which are numbered higher than the highest device number are not connected to the interconnection device 30, serial data may be produced in such a way as not to include data processing progress information for these processing elements.

The data producing section 32 may be configured as follows.

That is, this section may be equipped with a configuration information holding section in which configuration information for processing elements connected to the interconnection device is set. The serial data can be created in any format from the configuration information in the configuration information holding section.

An example of this configuration information is data having as many bits as there are processing elements that are connectable to the interconnection device 30. The bit numbers (positions) in the data are made to correspond one for one with the device numbers described above. Thus, the device number of any processing element connected to the interconnection device 30 can be known from the corresponding bit position. As the configuration information use may be made of information indicating processing elements that are connected to the interconnection device and are in the ready state (or an operable state).

In this case as well, the setting of the configuration information in the configuration information holding section may be performed through the use of a setting unit such as a service processor outside the interconnection device 30 or user-operable DIP switches mounted on the interconnection device 30.

In the case of a system in which the device numbers of the processing elements are determined according to the locations where they are connected to the interconnection device 30 as described above, the data producing section 32 may identify the highest device number of the processing elements 10 connected to the interconnection device 30 by the configuration information, thereby determining the length of the serial data according to the highest device number.

In this case, the data producing section 32 is permitted to create serial data that contains only data processing progress information for processing elements that are connected to the interconnection device 30 or processing elements that are connected to the interconnection device and are in the ready state.

In this case, each processing element is provided with a holding section that holds configuration information identical to the configuration information held in the configuration information holding section in the interconnection device 30 and refers to the contents of its holding section as well, thereby judging the progress of data processing by the processing elements.

Next, a data parallel processing system of FIG. 7 includes multiple interconnection devices 30, to each of which multiple processing elements 10 are connected through a first serial transfer line 22. Each interconnection device and the adjacent interconnection device are connected by a second serial transfer line 24. Each processing element enters information indicating the progress of its data processing into the corresponding interconnection device via the first serial transfer line. Each interconnection device broadcasts serial data including data processing progress information for processing elements connected to it to each of these processing elements via the first serial transfer line and transfers the same data to an adjacent interconnection device via the second serial transfer line. Thereby, each processing element is permitted to receive data processing progress information for all the processing elements within the system and data processing is performed in parallel in groups.

In the above configuration, each interconnection device 30 is equipped with an entry section 31a, a data producing section 32a, first and second broadcasting sections 33a and 36, and first and second transfer sections 34 and 35.

The entry section 31a receives data processing progress information sent from each processing element associated with it over the first serial transfer line 22, whereby the progress information is entered into that entry section 31a.

The data producing section 32a receives the data processing progress information for the associated processing elements 10 from the entry section 31a, then determines the format of serial data to be broadcasted to the associated processing elements on the basis of their placement and configuration and creates the serial data.

The first broadcasting section 33a broadcasts the serial data produced by the data producing section 32a to each of the associated processing elements 10 via the first serial transfer line 22.

The first transfer section 34 transfers the serial data produced by the data producing section 32a to the adjacent downstream interconnection device 30 via the second serial transfer line 24.

The second transfer section 35 transfers serial data transmitted from the adjacent upstream interconnection device 30 to the adjacent downstream interconnection device 30.

The second broadcasting section 36 broadcasts the serial data from the adjacent upstream interconnection device to all the associated processing elements 10 via the first serial transfer line 22.

Each processing element 10 includes a holding section 11a, a management section 12a, a judgment section 13a, a computing section 14a, and a notification section 15a.

The holding section 11a receives and holds serial data sent from the corresponding interconnection device over the first serial transfer line 22.

The management section 12a manages information about processing elements 10 which are grouped for parallel processing.

The judgment section 13a judges the progress of data processing on the basis of the contents of the serial data stored in the holding section 11a and the management information in the management section 12a.

The computing section 14a makes various computations for data processing and determines the timing of starting of computations for the next data processing in accordance with the results of judgment formed by the judgment section 13a.

The notification section 15a transmits data processing progress information indicating whether or not allotted data processing has terminated to the corresponding interconnection device 30 via the first serial transfer line 22 as instructed by the computing section 14a.

Each interconnection device 30 broadcasts serial data created by the other interconnection devices and received from the adjacent upstream interconnection device to each of the processing elements associated with it via the first serial transfer line 22 and transfers the serial data to the adjacent downstream interconnection device via the second transfer section 36. This permits the judgment section 13a in each processing element to judge the progress of data processing by all the processing elements included in the system by serial data held in the holding section 11a.

The data producing section 32a may create serial data on the basis of the placement of processing elements that are connected to the corresponding interconnection device and are in the ready state.

In the invention arranged as shown in FIG. 6, at the time a system is installed or started up, information is set which is related to the placement of processing elements 10 which are actually connected to an interconnection device 30, or which are connected to the interconnection device and are in the ready state.

That information is, for example, mode information that specifies the format of serial data to be broadcasted to the processing elements 10 or information indicating the connection configuration of processing elements which are actually connected to an interconnection device, or which are connected to the device and are in the ready state. This information will be set in a mode information holding section or a configuration information holding means, which, though not shown, are provided in the data producing section 32.

When the system is activated, multiple processing elements 10 connected to an interconnection device 30 are divided into groups to perform data processing in parallel. That is, processing elements in a group executes a program in parallel. During execution of data processing, each processing element 10 notifies the associated interconnection device of the progress of the data processing (whether the data processing has been terminated or not) at regular intervals through the notification section 15.

The interconnection device 30 receives data processing progress information from each processing element 10 and enters it into the entry section 31. The data producing section 32 produces serial data including the most recent data processing progress information for all the associated processing elements 10, which are actually connected to the interconnection device, or which are connected to the interconnection device and are in the ready state, entered into the entry section 31 in accordance with the previously set mode information or configuration information. In this case, the format of the serial data is selected such that its length becomes as short as possible. The format is directly specified by the mode information or determined automatically by the data producing section 32 on the basis of the contents of the configuration information.

The specific length of the serial data is determined by the highest device number, for example, in a system in which processing elements 10 are consecutively numbered to correspond with locations where they are connected to the interconnection device. In this case, a one-to-one correspondence is established between bit numbers in the serial data and device numbers. Alternatively, only data processing progress information for processing elements which are actually connected to the interconnection device, or which are connected to the interconnection device and are in the ready state is set in the serial data. In either case, the length of serial data depends on the highest device number.

The serial data produced by the data producing section 32 in this way is broadcasted over the serial transfer line 22 to each of the processing elements 10 which are actually connected to the interconnection device, or which are connected to the interconnection device and are in the ready state.

Upon receipt of the serial data, each processing element holds it in the holding section 11. The judgment section 13 gets from the management information set in the management section 12 information (e.g., device numbers) on processing elements in the same group and refers to the serial data held in the holding section 11 to examine whether all the processing elements in the same group have terminated their respective data processing. Note that, when the data producing section 32 in the interconnection device 30 has the above-described configuration information holding section, the judgment section 13 will also have the same configuration information holding section. Even if data processing progress information only for processing elements which are actually connected to the interconnection device, or which are connected to the interconnection device and are in the ready state has been set in the serial data, therefore, data processing progress information for processing elements in the same group can be extracted correctly from the serial data by referring to information in the configuration information holding section.

When it is known that all the processing elements in the same group have terminated data processing, the judgment section 13 outputs a barrier sync signal to the computing section 14 to instruct it to start the next data processing.

In response to this, the computing section 14 starts computations for the next data processing and, throughout data processing, informs the notification section 15 of the progress of the data processing at regular intervals. In response to this, the notification section 15 transmits to the interconnection device 30 information on the progress of data processing by the corresponding processing element.

Thus, the present invention has flexibility in changing the length of serial data for data processing synchronization to be sent to each processing element in accordance with the number of processing elements which are actually connected to an interconnection device 30, thus permitting the amount of serial data to be transferred to be adjusted according to a system configuration and the efficiency and speed of serial data transfer to be increased.

In the invention as shown in FIG. 7, each interconnection device 30 not only broadcasts serial data created by itself to the associated processing elements 10 in the same manner as the above-described invention through the first broadcasting section 33a but also broadcasts serial data created by other interconnection devices to the associated processing elements through the second broadcasting section 36.

That is, each interconnection device 30 broadcasts serial data created by the other interconnection devices and received from the adjacent upstream interconnection device to the associated processing elements 10 through the second broadcasting section 36 and transfers that serial data to the adjacent downstream interconnection device through the second transfer section 35. The serial data created by the corresponding data producing section 32a is transferred to the adjacent downstream interconnection device through the first transfer section 34.

If, therefore, each interconnection device passes a command which instructs the transfer of serial data created by itself to the adjacent downstream interconnection device to that downstream device, then each processing element within the system is permitted to receive not only serial data created by the corresponding interconnection device but also serial data created by all other interconnection devices.

That is, an interconnection device which holds that command broadcasts serial data created by the corresponding data producing section 32a to processing elements associated with it and transfers the serial data to the adjacent downstream interconnection device.

On the other hand, an interconnection device which holds no command broadcasts serial data transferred from the adjacent upstream interconnection device to its associated processing elements through the second broadcasting section 36 and transfers serially that serial data to the adjacent downstream interconnection device through the second transfer section 35.

If, therefore, the command makes a round of the whole system, then all the processing elements 10 within the system will hold serial data created by all the interconnection devices 30 within the system, i.e., serial data including data processing progress information for all the processing elements within the system, in their respective holding sections 11a.

The decision section 13a in each processing element monitors the serial data and the management information in the management section 12a to determine if all the processing elements in the same group as that processing element have terminated data processing. When the termination of data processing is confirmed, it is presented to the computing section 14a. In response to this, the computing section starts the next data processing. The notification section 15a receives information about the progress of the data processing from the computing section 14a, then produces data processing progress information and transmits it to the corresponding interconnection device 30.

Thus, besides having the same advantages as the configuration of FIG. 6, the configuration shown in FIG. 7 permits the amount of serial data transferred between every interconnection device to be varied to suit the system configuration. This will enable each processing element to know the progress of data processing by the other processing elements in the same group faster than ever before.

With a parallel computer using multiple processing elements (PEs) for parallel processing, it is required to interconnect these processing elements in order to permit communications among the PEs.

Figure 8:
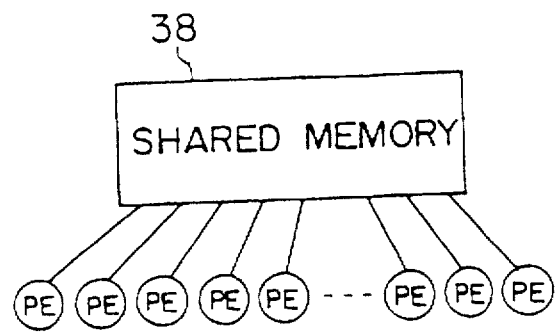
FIG. 8 shows a system configuration of a direct-coupled parallel computer.
Figure 9:
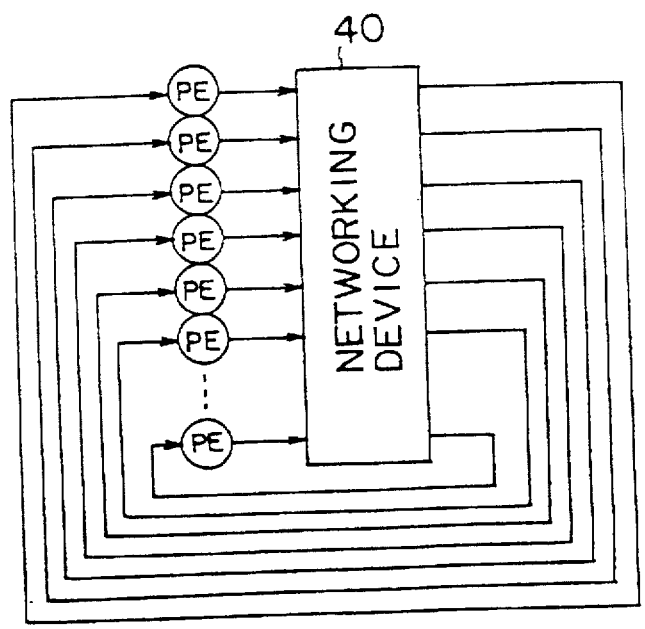
FIG. 9 shows a system configuration of an indirect-coupled parallel computer.

FIGS. 8 and 9 are each a schematic illustration of how to interconnect PEs.

The interconnection of PEs shown in FIG. 8 is generally called direct interconnection. In this configuration, processing elements PE share a memory 38 and make access to the shared memory 38 for communications among them.

On the other hand, the interconnection of PEs shown in FIG. 9 is generally called indirect interconnection. A networking device (interconnection device) 40 is provided which controls the connections between processing elements for communications among them. This networking device may be constructed from crossbar switches or a one-stage or multi-stage switching network.

The present invention can be applied to both the parallel computer systems shown in FIGS. 8 and 9. However, the embodiments of the present invention which will be described below are directed to the system shown in FIG. 9. In the following description, a reference numeral "10" is used to denote processing elements (PEs) and a reference numeral "40" is used to denote a networking device or devices for the sake of convenience.

Figure 10:
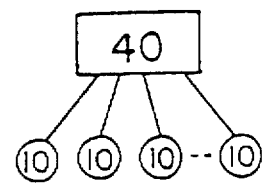
FIG. 10 shows a system configuration using one networking device.
Figure 11:
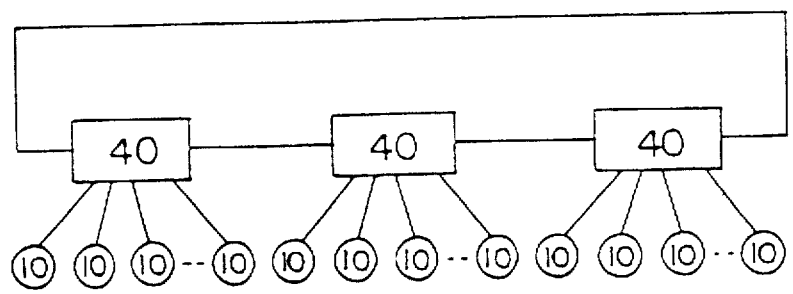
FIG. 11 shows a system configuration using more than one networking device.
Figure 12:
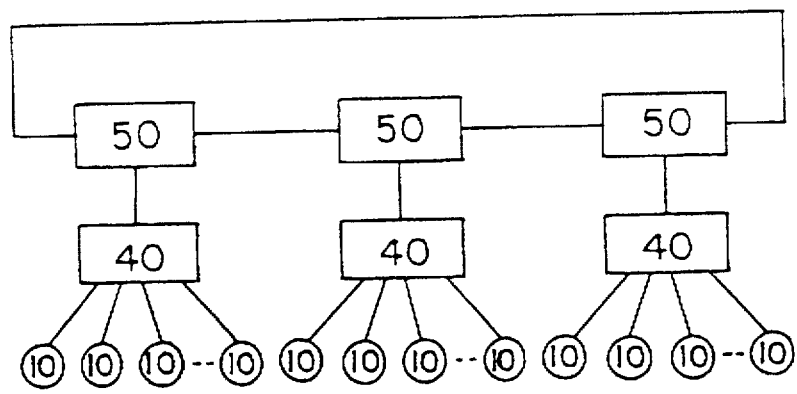
FIG. 12 shows a system configuration using higher networking devices.

To implement the barrier synchronization control of the present invention, a single networking device 40 will suffice in the case where a small number of processing elements 10 are used as shown in FIG. 10. Where many processing elements 10 are used, on the other hand, plural networking devices 40 may be interconnected in a loop configuration and processing elements 10 will be connected to each of these networking devices as shown in FIG. 11. Alternatively, such a system configuration as shown in FIG. 12 is also permitted in which plural higher networking devices 50 are interconnected in a loop configuration (ring configuration), an equal number of lower networking devices 40 are provided each of which is connected to a respective one of the higher networking devices, and processing elements 10 are connected to each of the lower networking devices.

Figure 13:
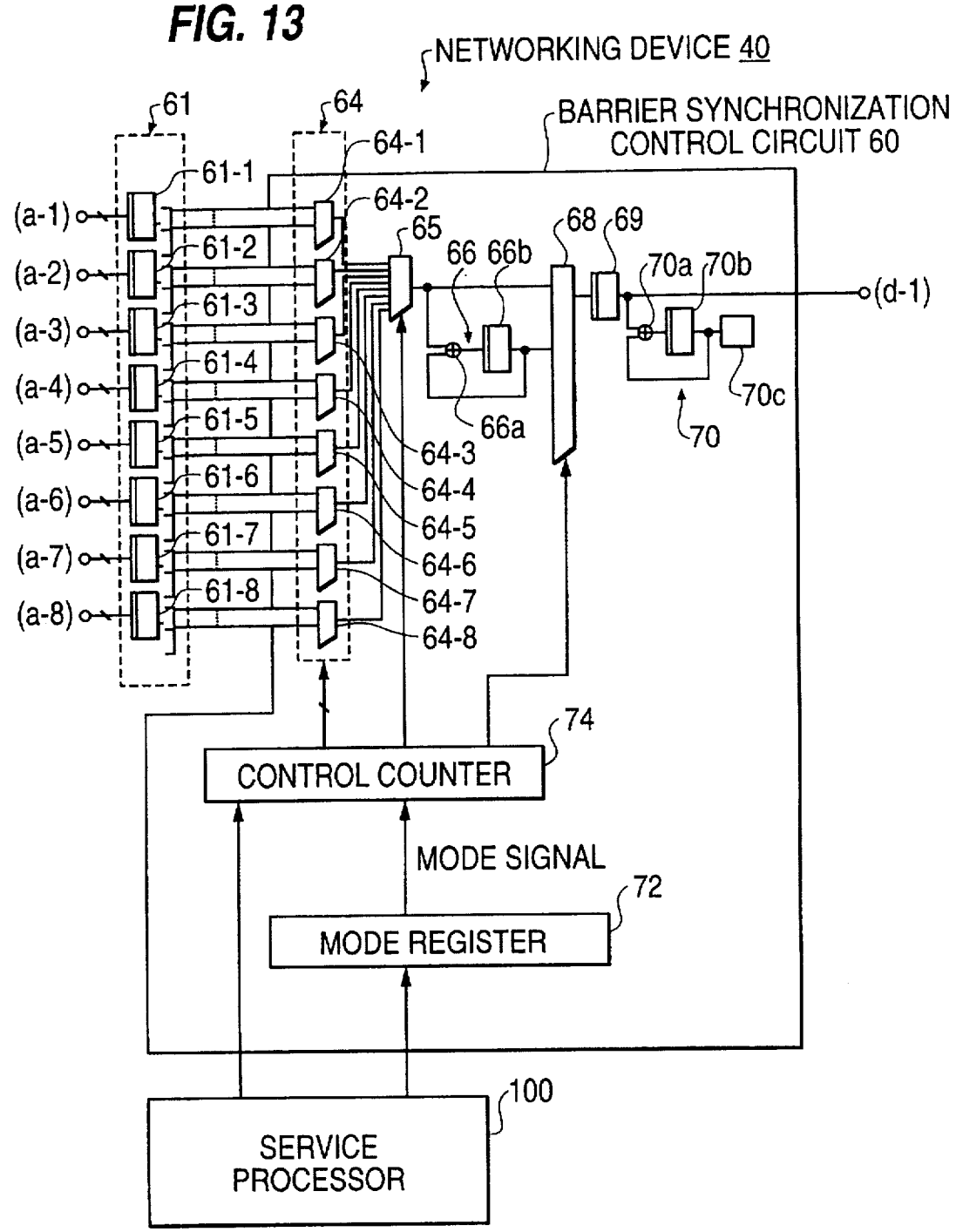
FIG. 13 is a block diagram of a first networking device.

FIG. 13 shows an example of a circuit configuration of a networking device 40 which implements the barrier synchronization control of the present invention in accordance with the system configuration of FIG. 10. Assume here that as many as 64 processing elements 10 are connectable to the networking device 40.

In the present embodiment, a barrier sync signal is produced and outputted on the processing element side. A barrier synchronization control circuit 60 broadcasts serial data required to produce the barrier sync signal to all of processing elements 10 connected to the networking device 40 via a serial transfer line not shown. This serial data includes information about the progress of data processing for all the processing elements. The format of the serial data will be described later in detail.

A PE status register section 61 consists of eight registers 61-1 to 61-8 each having eight positions, which latch data processing progress information sent from processing elements 10 connected to the networking device 40 for transmission to the barrier synchronization control circuit 60.

(a-1) denotes line terminals of eight data lines to receive data processing progress information sent from eight processing elements numbered 0 through 7 to the PE status register 61-1. (a-2) denotes line terminals of eight data lines to receive data processing progress information sent from eight processing elements numbered 8 through 15 to the PE status register 61-2. (a-3) denotes line terminals of eight data lines to receive data processing progress information sent from eight processing elements numbered 16 through 23 to the PE status register 61-3. (a-4) denotes line terminals of eight data lines to receive data processing progress information sent from eight processing elements numbered 24 through 31 to the PE status register 61-4. (a-5) denotes line terminals of eight data lines to receive data processing progress information sent from eight processing elements numbered 32 through 39 to the PE status register 61-5. (a-6) denotes line terminals of eight data lines to receive data processing progress information sent from eight processing elements numbered 40 through 47 to the PE status register 61-6. (a-7) denotes line terminals of eight data lines to receive data processing progress information sent from eight processing elements numbered 48 through 55 to the PE status register 61-7. (a-8) denotes line terminals of eight data lines to receive data processing progress information sent from eight processing elements numbered 56 through 63 to the PE status register 61-8.

(d-1) denotes a line terminal of a data line through which serial data is sent from the barrier synchronization circuit 60 to the 64 processing elements which are associated with it.

Next, the configuration of the barrier synchronization control circuit 60 will be described.

A selector section 64 consists of eight selectors 64-1 to 64-8 in correspondence with the eight PE status registers 61-1 to 61-8. A selector 64-i comprises a multiplexer which sequentially outputs eight bits of data input from the corresponding PE status register 61-i one bit at a time.

A selector 65 comprises a multiplexer which sequentially outputs one of eight inputs from the eight selectors 64-1 to 64-8 in a predetermined order.

A parity bit generator 66 comprises an EXCLUSIVEOR circuit 66a and a register 66b and generates a parity bit every 8 bits of output from the selector 65.

A selector 68 receives each piece of 8-bit serial data output from the selector 65 and the corresponding parity bit from the parity generator 66 and adds the parity bit to the serial data. At this point, a logic "0" bit is added to the parity bit.

A register 69 sequentially latches bits in the serial data output from the selector 68, whereby the data will appear at the line terminal (d-1) in serial form, one bit at a time.

A test circuit 70, which comprises an EXCLUSIVEOR circuit 70a, a register 70b, and a check circuit 70c, performs parity check on the serial data output from the register 69.

In the present embodiment, the format of the above serial data is determined by the placement and configuration of processing elements 10 that are actually connected to the networking device 40, or that are connected to the networking device and are in the ready state. Thus, the serial data can take various formats. In the present embodiment, a separate mode is previously assigned for each format and, at the time of installation, mode information is set through an external service processor 100 or DIP switches (not shown) mounted on the networking device itself.

A mode register 72 holds mode information set in the above described manner.

A control counter 74 is responsive to mode information stored in the mode register 72 to control the selectors 64-1 to 64-8 and the selectors 65 and 68 so that serial data will be created in a format corresponding to the set mode.

Figure 14:
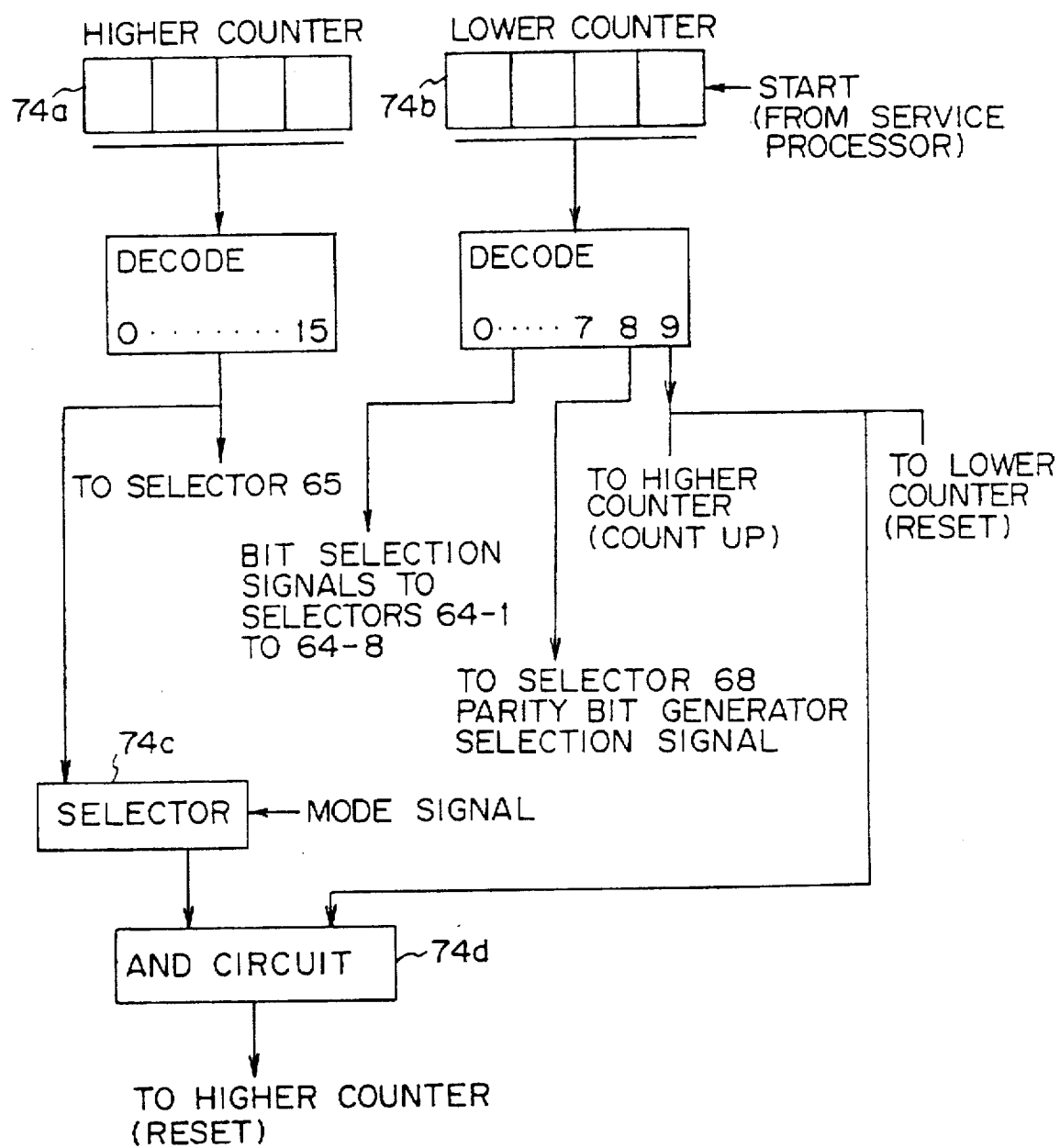
FIG. 14 is a block diagram of a control counter.

FIG. 14 shows a configuration of the control counter 74. The counter 74 comprises a higher counter 74a, a lower counter 74b, a selector 74c, and an AND circuit 74d. Upon receipt of a START signal from the service processor 100, the lower counter 74b, which is a decimal counter, counts up with each clock pulse. The lower counter 74b provides bit selection signals to each of the selectors 61-1 to 61-8 until the count in the counter reaches eight. When a count of eight is reached, the lower counter 74b outputs to the selector 68 a select signal to select the register 66b. When a count of nine is reached, the counter is reset to zero.

The higher counter 74a advances one count each time the count in the lower counter 74b is changed from nine to zero and provides a control signal to the selector 65. When the count in the lower counter 74b is changed from nine to zero after the higher counter 74a has reached the previously set maximum count, the higher counter 74a is reset by an output of the AND circuit 74d. The maximum count of the higher counter 74a depends on a mode signal (mode information) from the mode register 72 which is applied to the selector 74c.

Figure 15:
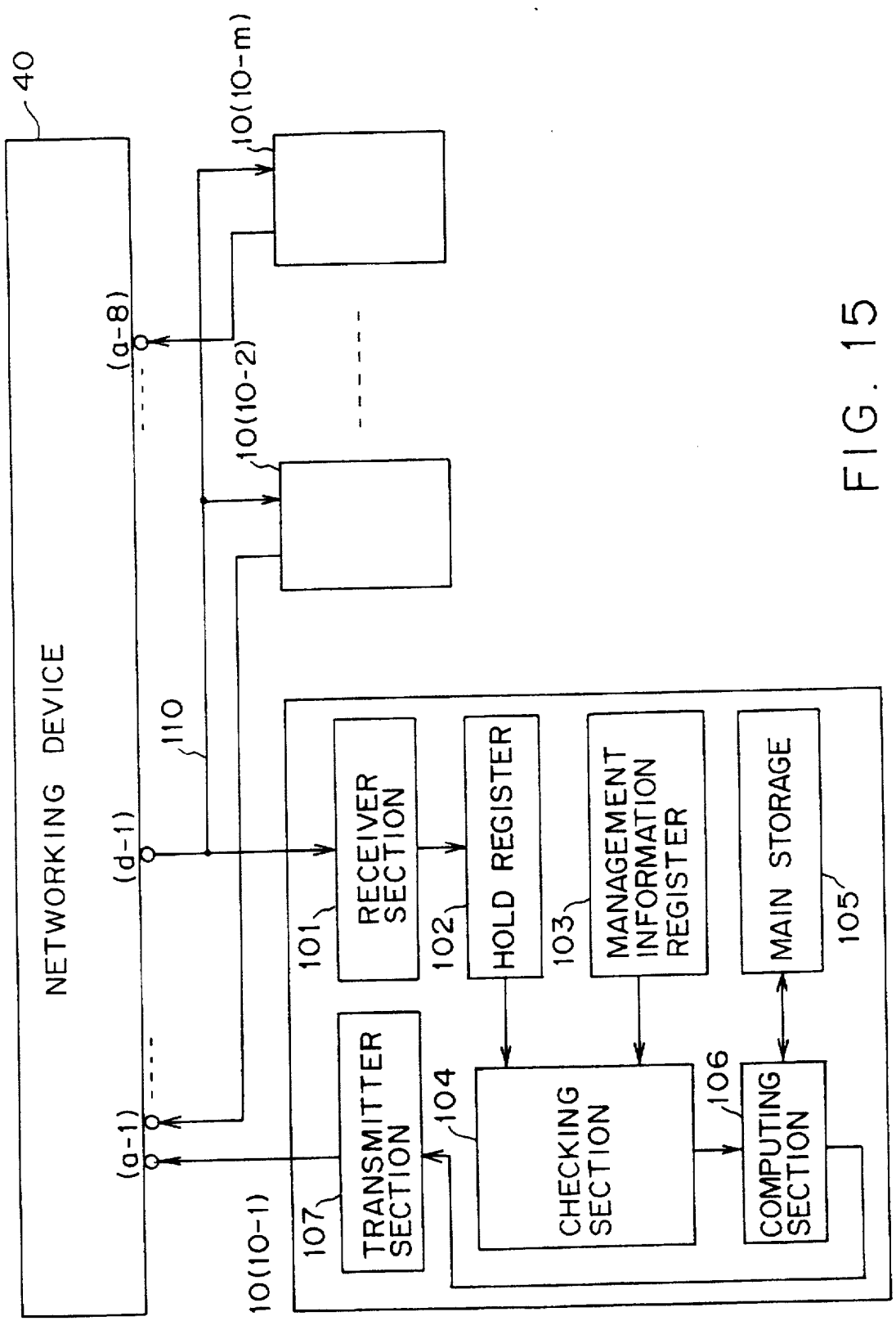
FIG. 15 shows a processing element in block diagram form.

FIG. 15 shows an exemplary configuration of a processing element 10.

A receiver section 101 receives the serial barrier data from the line terminal (d-1) via a serial transfer line 110.

A hold register 102 holds the barrier data received by the receiver section 101.

A management information register 103 stores PE name information on other processing elements which are allotted to the same processing as that processing element.

A check section 104 monitors the barrier data in the hold register 102 and the contents of the management information register 103 to determine if the current program processing has been terminated by all the processing elements in the same group for parallel processing. Upon detecting the program processing termination, it outputs a barrier sync signal.

Main storage 105 comprises a memory for storing data used for computation.

A computing section 106 is equipped with a vector unit having various pipelines, such as a mask pipeline, a multiplication pipeline, an addition/logical operation pipeline, a division pipeline, etc., and a scaler unit for carrying out scaler operations. The computing section 106 fetches data streams from the main storage 105 successively and performs successive processing on the data streams in a pipeline manner. The results of the processing are successively stored in the main storage 105 as data streams. The computing section 106 terminates the data processing with notification to a transmitter section 107.

Upon receipt of that notification, the transmitter section 107 transmits program processing termination information to the line terminal (a-1) of the networking device 40. As long as the transmitter section 107 is not notified of data processing termination, it transmits to the line terminal (a-1) information indicating that the program processing is in progress.

Upon receipt of a barrier sync signal from the check section 104, the computing section 107 starts executing the next data processing.

The setting of the above PE name information in the management information register 103 is performed by the service processor 100 by way of example.

Examples of formats of the serial data will be described hereinafter.

Figure 16:
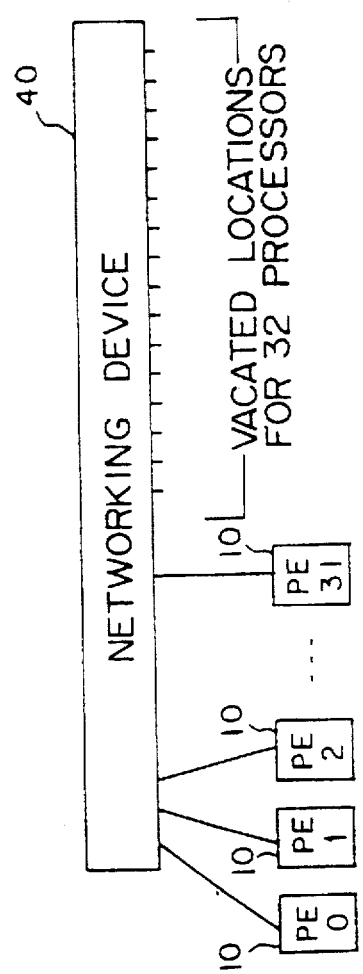
FIG. 16 is a diagram for use in explanation of a data parallel processing system.

First, assume that a range of processing elements 10 (PE0 to PE31) consecutively numbered 0 through 31 are connected to the networking device 40, but other processing elements 10 (PE32 to PE63) are not connected as shown in FIG. 16.

In the case of such a system, the barrier synchronization control circuit 60 produces serial data having such a format as shown in FIG. 17 and broadcasts it to the processing elements 10 (PE0 to PE31).

Next, the structure of the serial data will be described.

The first 10 bits numbered 0 through 9 form unique data in which all these bits are ones. This unique data is used for each processing element to detect the beginning of serial data. The remaining serial data with bit numbers 10 through 49 is split into blocks of 10 bits.

The 10 bits 10 through 19 consist of 8 bits of data each of which indicates the progress of data processing by a respective one of processing elements 10 (PE0 through PE7), a parity bit added to the 8-bit data, and a bit of logic "0". The parity bit is generated by the parity bit generator 66. The logic "0" following the parity bit is added to ensure that the corresponding 10-bit data will not become all ones, i.e., to avoid the possibility that the corresponding 10-bit data may become identical to the all-one 10-bit data adapted to detect the beginning of serial data.

As in the 10-bit data block with bits 10 through 19, in the respective 10-bit data blocks with bits 20 through 29, 30 through 39, and 40 through 49 is set data processing progress information for processing elements numbered 8 through 15 (PE8 through PE15), 16 through 23 (PE16 through PE23) and 24 through 31 (PE24 through PE31), respectively.

In a system in which only eight processing elements 10 (PE0 through PE7) are connected to the networking device 40, 20-bit serial data having such a format as shown in FIG. 18 will be created by the barrier synchronization control circuit 60.

If the number of processing elements 10 connected to the networking device is not an integral multiple of 8, for example, if 13 processing elements 10 (PE0 through PE12) are connected, data processing progress information for unconnected processing elements (PE13 through PE15) corresponding to bit numbers 23 through 25 are fixed to logics "0" as shown in FIG. 19.

In the following description, serial data, which contains data processing progress information for all processing elements 10 connected to the networking device 40 and is formatted as shown in FIGS. 17, 18 and 19, will be called barrier data.

The operation of the barrier synchronization control circuit 60 will be described.

First, at the time the system is installed, mode information corresponding to the system configuration indicating processing elements that are connected to the networking device 40 is set in the mode register 72 in the barrier synchronization control circuit 60 by the service processor 100.

Next, the operation when the system is active will be described.

At this point, the control counter 74 has already been loaded with the mode information from the mode register 72. Upon receipt of a barrier synchronization control start signal from the service processor 100, the control counter 74 starts controlling the selectors 64, 65 and 68 according to the mode information.

For control of the selector 64, the format of barrier data is judged using the mode information. The format of the barrier data depends on the highest device number "m" assigned to one of processors connected to the networking device 40 as described above. If, therefore, program processing progress information from a processing element assigned the highest device number is applied to the line terminal (a-i) (i=1 to 8), then the control counter 74 controls input selection signals for the selectors 64-1 to 64-i so that data processing progress information for the 0th through (8×i-1)st processing elements, which has been latched in the PE status registers 61-1 through 61-i corresponding to the (a-1) to (a-i) line terminals, will be entered into the selector 65 in ascending order of device numbers. If, in this case, the highest device number, m, is not an integral multiple of eight, then data processing progress information for processors numbered (m+1) through (8×i-1), which are not actually connected to the networking device 40, will be made invalid (for example, set to all "0"s at all times).

The control counter 74 controls the selector 65 by an input selection signal to it in the following manner.

The selector 65 is input simultaneously with 8-bit serial data from the selectors 64-1 to 64-i. The selector 65 sequentially outputs its 8-bit inputs from the selectors 64-1 to 64-i to the selector 68 and the parity bit generator 66. At this point, the control counter 74 causes the selector 65 to output the 8-bit serial data at regular intervals. That is, the control counter 74 adjusts the timing by which the 8-bit serial data is output from the selector 65 to fit the processing time in the parity bit generator 66.

The parity bit generator 66 generates a parity bit for each of i strings of 8 bits, each string containing data processing progress information for eight processing elements numbered 0 through 7, 8 through 15, . . . , or (8×(i-1)) through (8×i-1), then outputs it to the selector 68.

The control counter 74 controls the selector 68 by an input selection signal to it in the following manner. First, the control counter 74 controls the selector 68 in such a way as to output the 8-bit serial data from the selector 65 to the register 69 and then output a parity bit produced by the parity bit generator 66 to the register 69. Moreover, a bit of logic "0" is output from the selector 68 subsequently to the parity bit. Furthermore, the selector 68 adds an all-logic-one bit string that is 10 bits long to the beginning of the serial data input from the selector 65.

The register 69 latches the serial data input from the selector 68 and broadcasts serial data (barrier data) formatted as shown in FIG. 17, 18 or 19 to all the processing elements connected to the networking device 40 through the line terminal (d-1).

The processing elements numbered 0 through m each receive the barrier data through their respective receiver section 101 and store it in their respective hold register 102. Subsequently, in each processing element, the check section 104 checks the barrier data in the hold register 102 and the PE name information for processing elements in the same group for parallel processing entered into the management information register 103 to determine if all the processing elements in the same group have terminated their respective program processing. When it is determined that all the processing elements have terminated the program processing, the check section 104 provides a barrier sync signal to the computing section 106. Upon receipt of the barrier sync signal, the computing section 106 starts the next data processing.

Figure 20:
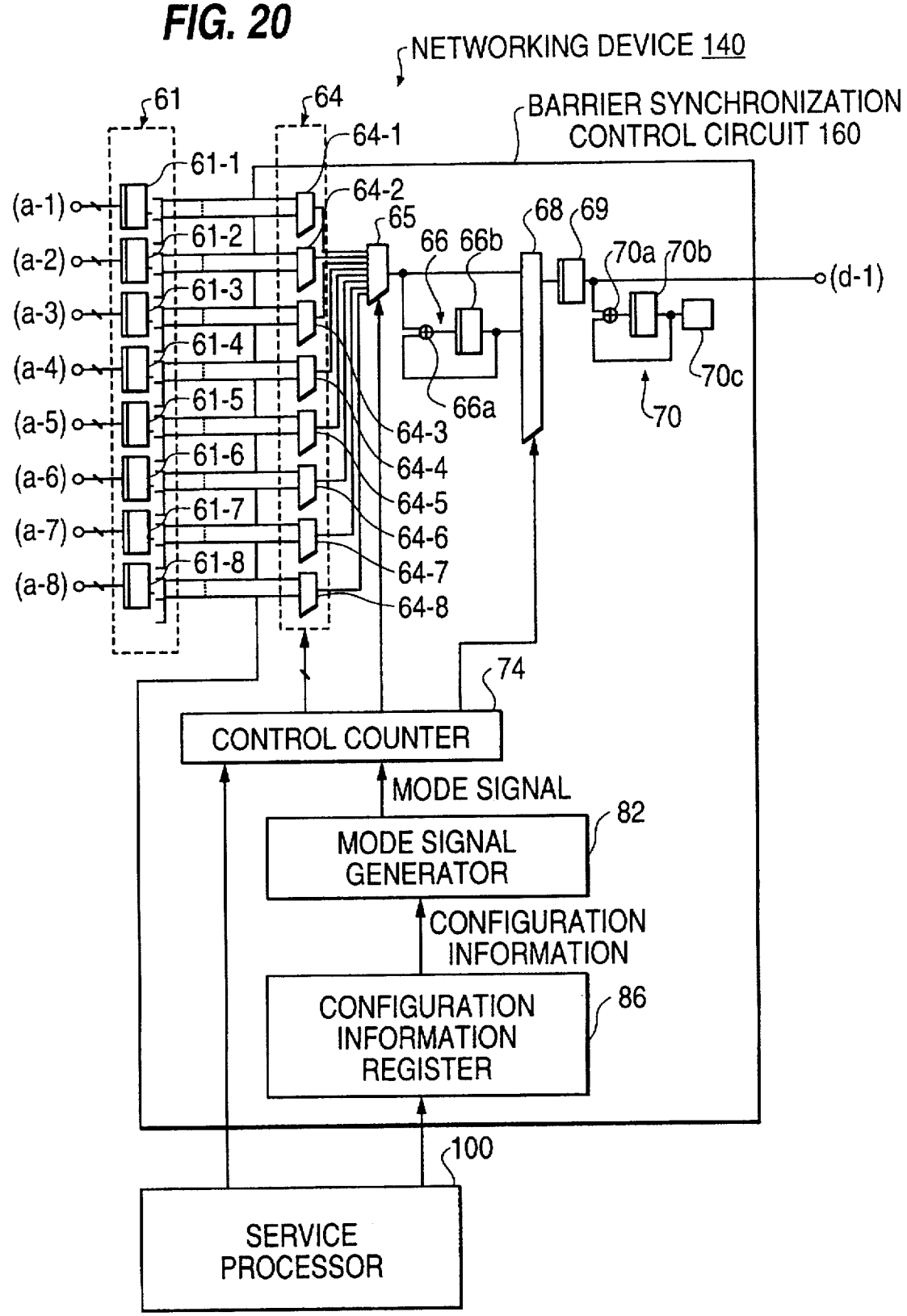
FIG. 20 is a block diagram of a second networking device.

FIG. 20 is a block diagram of a networking device 140 which functions identically to the above-described networking device 40. In FIG. 20, the same reference numerals as those in the networking device 40 are used to denote corresponding blocks and their detailed descriptions are omitted.

In a barrier synchronization control circuit 160, the function of the mode register 72 in the previously described networking device 40 is implemented by means of a configuration information register 86 and a mode signal generator 82.

Figure 21:
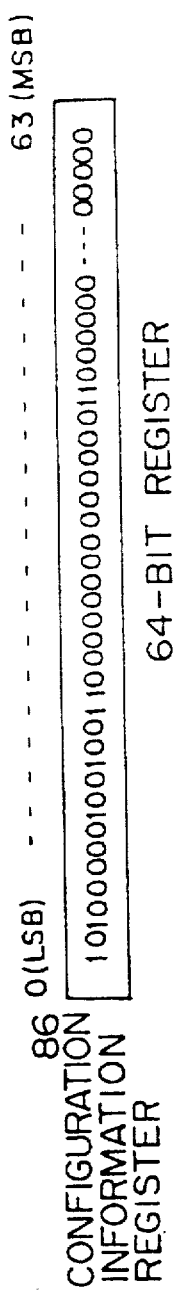
FIG. 21 is a diagram for use in explanation of data in the configuration register.

The configuration information register 86 comprises a 64-bit register as shown in FIG. 21. Each of bits 0 (LSB), 1, . . . , 63 (MSB) holds configuration information representing connection information for a respective one of processing elements numbered 0, 1, . . . , 63. That is, each bit is set to one when a corresponding processing element is connected to the networking device 140 or to zero when it is not connected. The configuration information is set through the use of service processor 100 or DIP switches not shown.

The mode signal generator 82 decodes the configuration information from the configuration information register 86 to generate a mode signal for application to the control counter 74. Decoding is performed by scanning the configuration information in the direction in which bit numbers ascend and detecting the highest-order bit that is set to one. That is, the bit number of that highest-order bit corresponds to the greatest device number of processing elements connected to the networking device 140, and a mode signal corresponding to the greatest device number is produced.

Thus, in the networking device 140, a mode signal is produced automatically from configuration information which indicates the system configuration of a parallel computer which is provided by the service processor 100 or DIP switches. The control counter 74 is responsive to the mode signal to control the selectors 64, 65, and 68 as in the previously described networking device 40. Thus, the networking device 140 operates identically to the networking device 40 except that the mode signal is produced inside.

Figure 22:
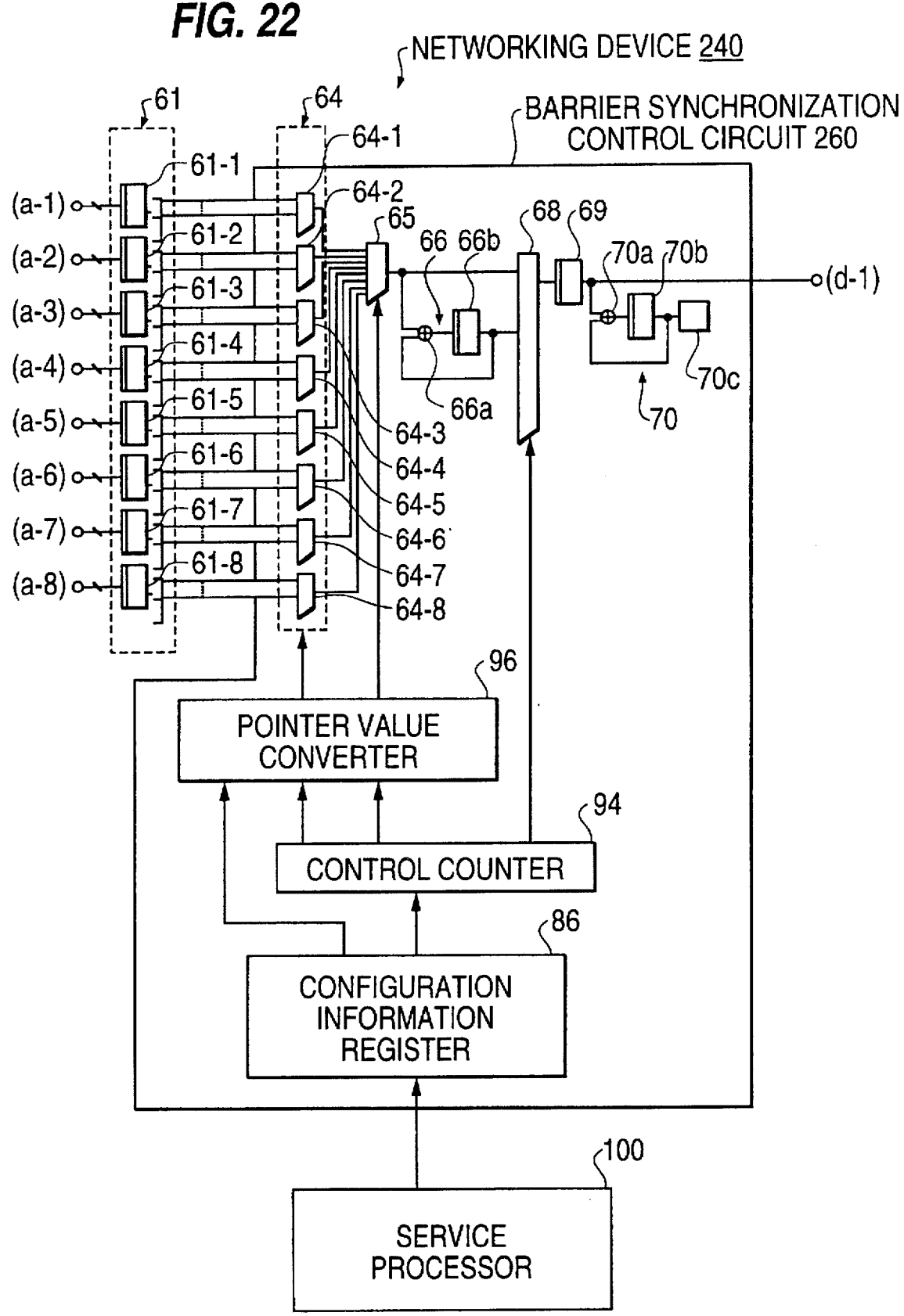
FIG. 22 is a block diagram of a third networking device.

FIG. 22 is a block diagram of a networking device 240 which produces barrier data (serial data) having a format that differs from those in the networking devices 40 and 140 described previously. In this figure, the same reference numerals as those in the networking device 140 are used to denote corresponding blocks and their detailed descriptions are omitted.

Figure 23:
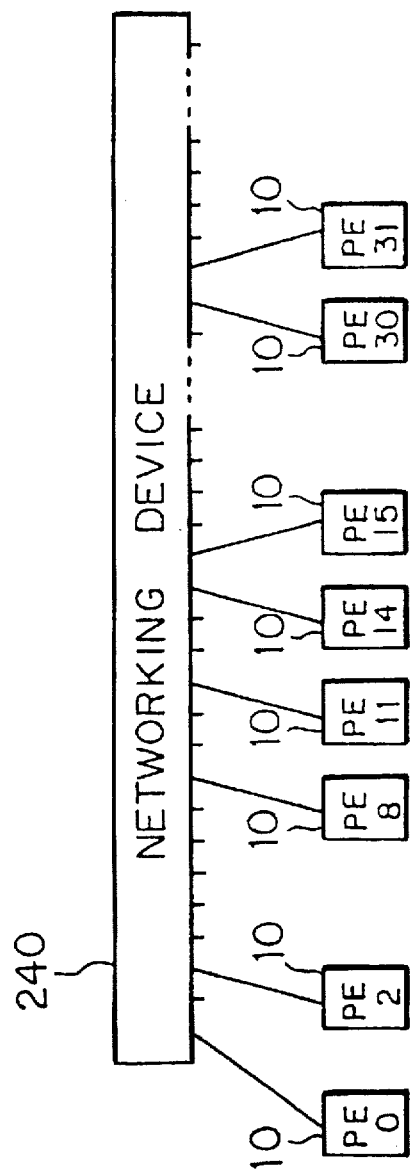
FIG. 23 shows another data parallel processing system.

This networking device 240 produces compressed barrier data as shown in FIG. 24 when processing elements 10 are connected at irregular intervals as shown in FIG. 23. That is, in the example of FIG. 23, eight processing elements assigned device numbers 0, 2, 8, 11, 14, 15, 30, and 31 are connected to the networking device 240. In such a case, the networking device 240 produces barrier data in which bits 0 through 9 are set to all ones to indicate the beginning of the barrier data, and data processing progress information only for actually connected processing elements is inserted into bit positions 10 through 17 in the order of device numbers. In this case as well, a parity bit is generated for 8-bit data indicating data processing progress information for the eight processing elements PE0, PE2, PE8, PE11, PE14, PE15, PE30, and PE31, then it is added immediately after the 8-bit data as bit 18. A logic "0" bit is further added immediately after the parity bit as bit 19.

The configuration of the barrier synchronization control circuit 260 adapted to produce barrier data formatted as shown in FIG. 24 will be described below.

The control circuit 260, like the barrier synchronization control circuit 160 in the networking device 140 previously described, is equipped with a configuration information register 86 in which system configuration information is set by service processor 100 or DIP switches.

A control counter 94 decodes the configuration information from the register 86 to produce input select signals to be applied to the selector 68. The number of processing elements connected to the networking device 240 can be seen from the number of logic "1" bits in the configuration information. The length of barrier data in bit is determined by the number of processing elements connected to the networking device 240. The control counter 94 determines the timing of control of the selector 68 according to the barrier data length.

The control counter 94 also decodes the configuration information to produce input selection signals to be applied to the selectors 64-1 to 64-8 and the selector 65. The input selection signals for the selectors 64-1 to 64-8 depend on the greatest device number, m, of processing elements connected to the networking device 240, which is obtained from the configuration information. If data processing progress information from the processing element having the greatest device number, m, is applied to the line terminal (a-i)(i=1 to 8), the control counter 94 outputs corresponding input selection signals to each of the selectors 64-1, 64-2, ..... 64-i corresponding to the line terminals (a-1), (a-2), . . . (a-i) periodically and sequentially in the order of mention of the selectors.

Also, the control counter 94 controls the selector 65 in such a way that serial data sequentially output from the selectors 64-1 to 64-i is output periodically and sequentially in the order in which the serial data is output from the selectors 64-1 to 64-i.

A pointer value converter 96 receives the input selection signals for the selectors 64-1 to 64-i and the selector 65 from the control counter 94 and the configuration information from the configuration information register 86. This pointer value converter 96 converts the input selection signals for the selectors 64-1 to 64-i so that these selectors are permitted to output selectively valid data processing progress information, i.e., only data processing progress information from processing elements that are connected to the networking device 240, in the order of device numbers. The converted input selection signals are then applied to the selectors 64-1 to 64-i.

For the input selection signal for the selector 65 from the control counter 94, the pointer value converter 96 performs signal conversion on the basis of the configuration information so that the time interval, during which serial data from each of the selectors 64-1 to 64-i is output from the selector 65, is made variable.

That is, in the case of the exemplary system configuration as shown in FIG. 23, data processing progress information from the processing elements numbered 0 and 2 is output from the selector 64-1 in turn under the control of the pointer value converter 96. Next, data processing progress information from the processing elements numbered 8, 11, 14 and 15 is output from the selector 64-2 in turn. Finally, data processing progress information for the processing elements numbered 30 and 31 is output from the selector 64-4 in turn.

In this case, therefore, it will be understood that 2-bit serial data is output from the selector 64-1, 4-bit serial data is output from the selector 64-2, and 2-bit serial data is output from the selector 64-4. The serial data from each selector is output to the selector 65 in sequence. Note that, in this case, the selector 64-3 provides no data to the selector 65. Thus, the pointer value converter 96 converts the input selection signals for the selectors 64-1 to 64-4 in order to permit the selectors 64-1, 64-2 and 64-4 to select and output 2 bits, 4 bits and 2 bits data, respectively. The converted input selection signals are periodically applied to these selectors.

In this way, serial data from the selector 65, into which data processing progress information for all of processing elements actually connected to the networking device 240 is packed in the order of their device numbers, is entered into the selector 68 and the parity bit generator 66. A parity bit generated by the parity bit generator 66 is added to every 8 bits of serial data. In the selector 68, a logic "0" bit is inserted immediately after the parity bit. Also, in the selector 68, all-logic-one 10-bit serial data is added before that serial data to indicate the beginning of barrier data. The barrier data thus produced is broadcasted to all the processing elements 10 via the line terminal (d-1).

Each processing element 10 is equipped, though not shown, with a register identical to the configuration information register 86 that the networking device 240 has, in which, as in the case of the networking device, system configuration information is set by service processor 100. Each processing element extracts data processing progress information for other processors in the same group from received barrier data on the basis of the configuration information set in that register.

As shown in FIG. 25, the total number of processing elements 10 connected to the networking device 240 may be, say, 11, not an integral multiple of 8. In such a case, logic "0"s are placed into the remaining bit positions after a bit for the processing element assigned the greatest device number (38 in this example) in a barrier data format as shown in FIG. 26.

The embodiments so far described are directed to systems in which one networking device is used. The embodiments described below are directed to systems in which more than one networking devices (40, 140, or 240) are interconnected in a loop configuration.

Figure 27:
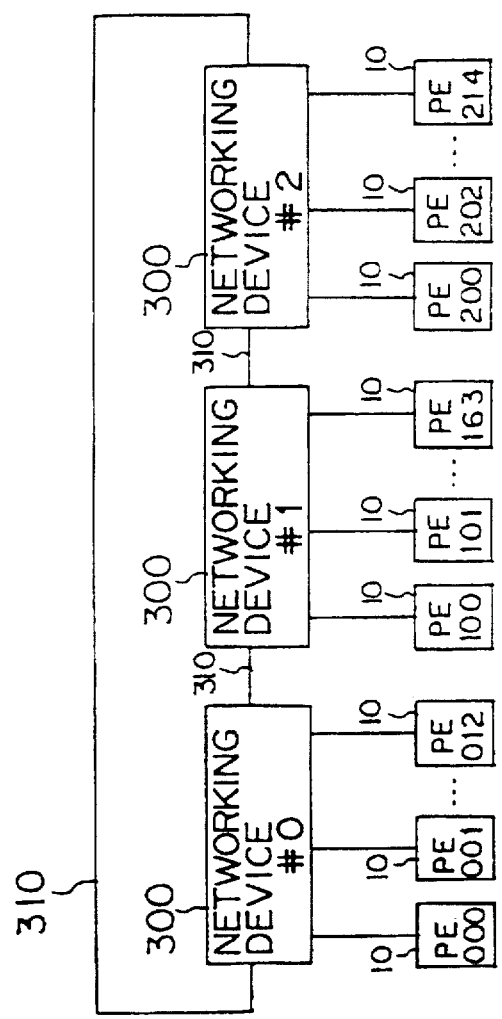
FIG. 27 shows a data parallel processing system equipped with more than one networking device.

FIG. 27 shows an example of such a system.

In FIG. 27, three networking devices (interconnection devices) 300, which are consecutively numbered #0, #1 and #3, are interconnected in a loop configuration by a serial transfer line (second serial transfer line) 310. Each of the networking devices 300 may comprise the networking device 40, 140, or 240 configured described previously.

To the #0 networking device 300 are connected 12 processing elements 10 (PE000 through PE012) consecutively numbered 0 through 12. To the #1 networking device 300 are connected 64 processing elements 10 (PE100 through PE163) consecutively numbered 100 through 163. To the #2 networking device 300 are connected eight processing elements 10 (PE200, PE202, . . . , PE214) numbered, in increment of two, from 200 through 214.

In such a system equipped with multiple networking devices 300, each networking device produces barrier data on the basis of data processing progress information from all the processing elements 10 connected thereto in the manner described above. This barrier data is broadcasted to the associated processing elements and serially sent to the adjacent downstream networking device 300 over the serial transfer line 310.

In the above system, since the networking devices 300 are interconnected in a loop configuration, the greatest-numbered networking device (the #3 networking device) transmits barrier data produced by it to the smallest-numbered networking device 300 (the #0 networking device) via the serial transfer line 310. That is, the adjacent networking device downstream of the greatest-numbered networking device is the smallest-numbered networking device in the system.

In this system, each processing element 10 receives not only data processing progress information for processing elements connected to the corresponding networking device but also data processing progress information for processing elements connected to the other networking devices. This is because each processing element can execute data processing with several processing elements connected to the other networking devices in a group. Thus, the barrier data to be broadcasted to each processing element in the present system is formed by concatenating serially of separate sets of barrier data produced by each networking device. In order to permit each processing element to identify sets of barrier data produced by the respective networking devices, 8-bit group ID information is added to each of sets of barrier data, which indicates which networking device produced it. The group ID is identical to the device number of the corresponding networking device. A parity bit and a logic "0" bit are also added to each group ID.

Figure 28:
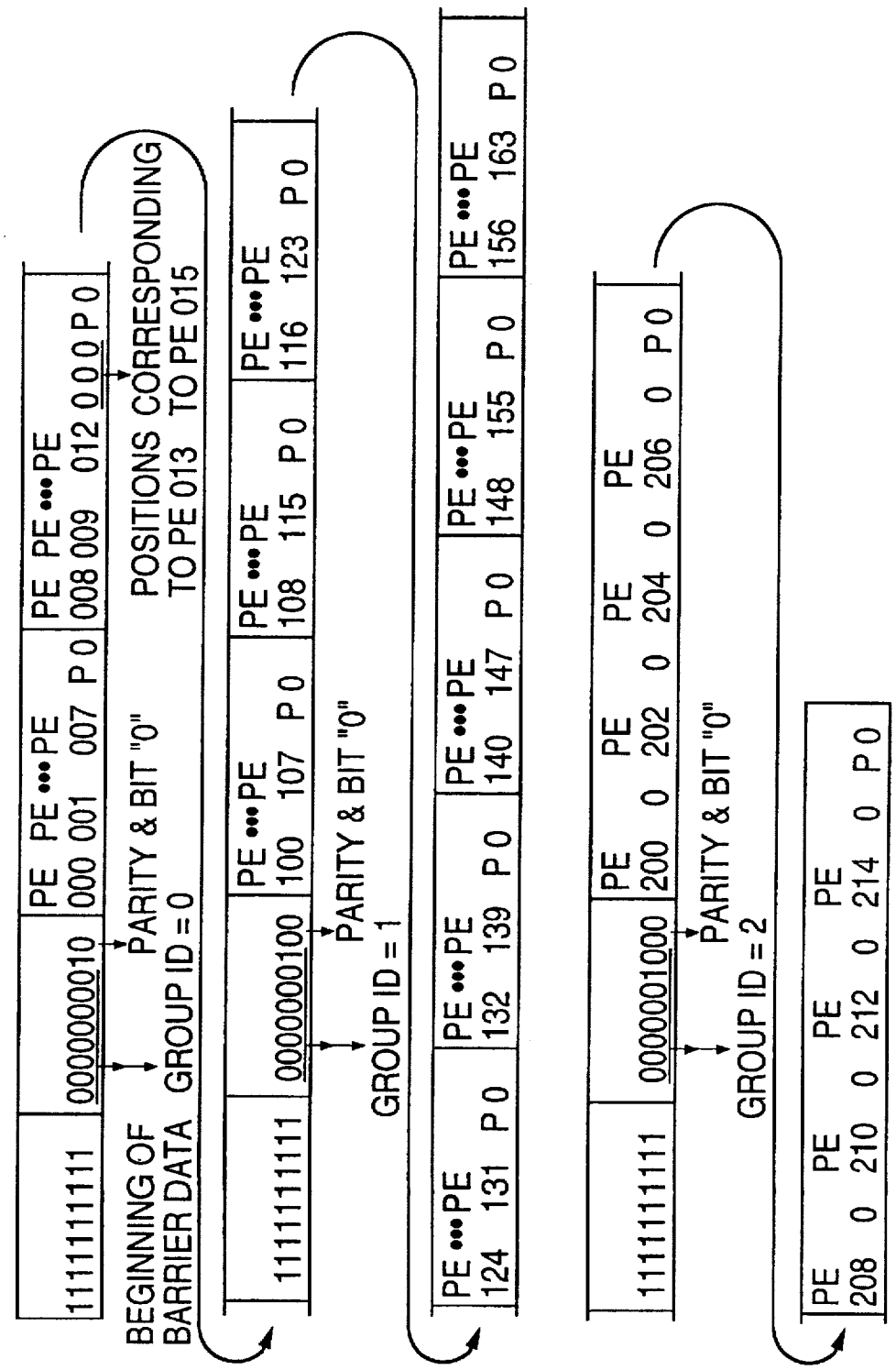
FIG. 28 shows the format of barrier data broadcasted to each processing element when the first or second networking device is used in the data parallel processing system shown in FIG. 27.

FIG. 28 shows the format of barrier data produced in a system which uses the networking devices 40 or 140 described above as the networking devices 300. The barrier data is segmented into groups of 10 bits. Each 10-bit group is referred hereinafter to as a field.

The leading field consists of all-logic-one data indicating the beginning of the barrier data. The next field consists of 8-bit data indicating a group ID value of 0, a parity bit added to the group ID, and a bit "0". In the following successive fields, data processing progress information for all the processing elements that are connected to the #0 networking device 300 whose group ID value is 0 is set up in the same format as the barrier data shown in FIG. 17.

The sets of barrier data produced by the #1 (group ID=1) and #2 (group ID=2) networking devices in the same format are placed to follow the barrier data produced by the #0 (group ID=0) networking device in the order of ascending group IDs.

Figure 29:
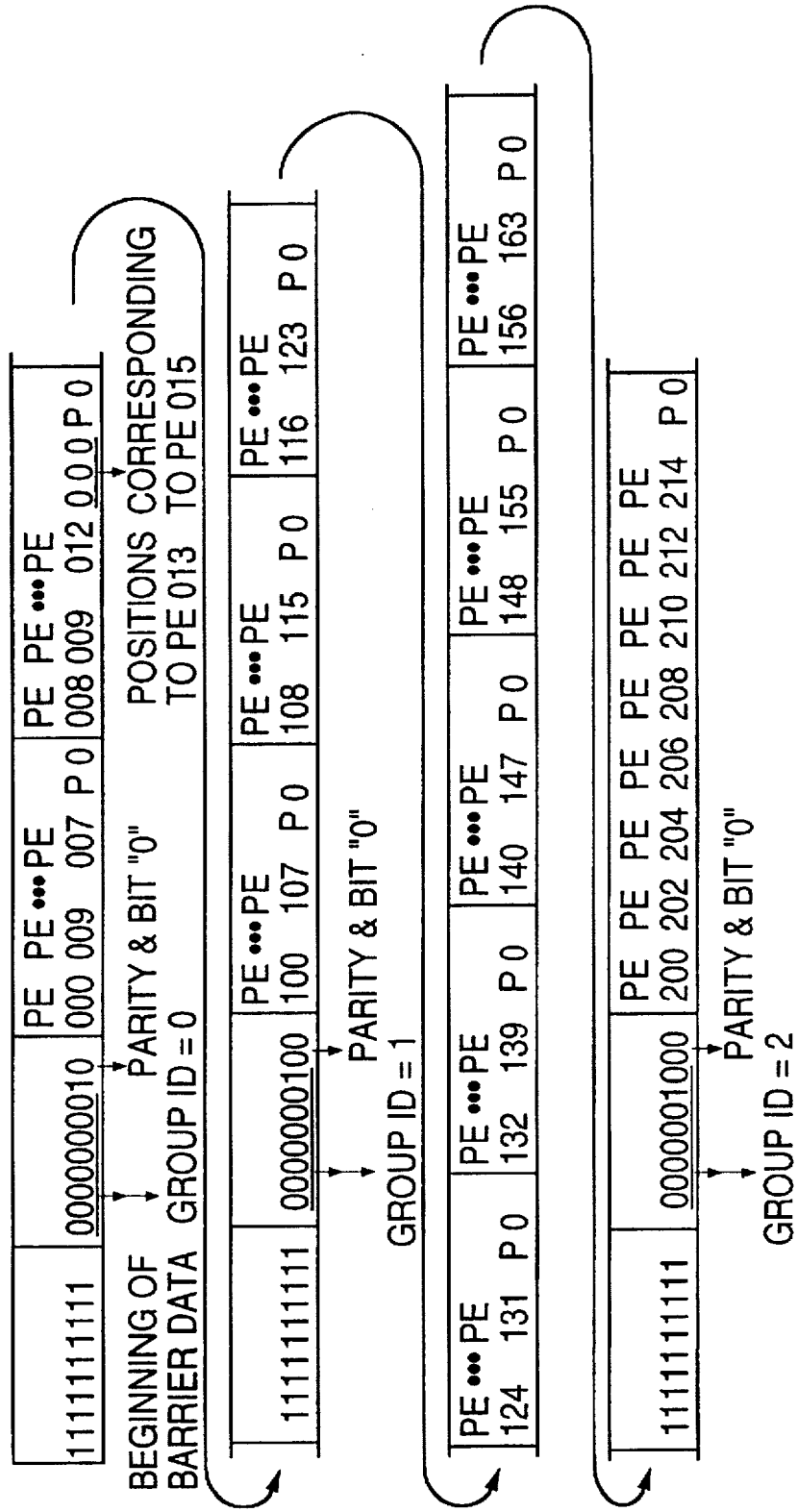
FIG. 29 shows the format of barrier data broadcasted to each processing element when the third networking device is used in the data parallel processing system shown in FIG. 27.

FIG. 29 shows the format of barrier data produced in a system which uses the above-described networking devices 240 as the networking devices 300. In this case as well, as in the barrier data shown in FIG. 28, sets of barrier data produced by the respective networking devices with their respective group IDs added at the beginning thereof are concatenated in the order of ascending group IDs.

Next, the operation of a parallel computer system in which the three networking devices 300 are interconnected in a loop configuration will be described.

(T1) First, the service processor 100 supplies to the #0 networking device 300 a control signal (hereinafter referred to as a parent command) which commands it to produce and transfer barrier data. In response to receipt of the parent command, the #0 networking device produces barrier data from data processing progress information received from the processing elements 10 connected to it in the above-described manner. The #0 networking device then broadcasts the barrier data to the processing elements connected to it via the first serial transfer line not shown and transfers the barrier data to the adjacent downstream #1 networking device via the second serial transfer line 310.

(T2) The downstream #1 networking device 300 broadcasts the barrier data (group ID=0) transferred from the upstream #0 networking device to its associated processing elements via the first serial transfer line not shown and transfers that barrier data to its adjacent downstream #2 networking device (group ID=2) via the second serial transfer line 310.

(T3) The #2 networking device 300 receives the barrier data produced by the #0 networking device, then broadcasts that barrier data to its associated processing elements via the first serial transfer line not shown.

Figure 30:
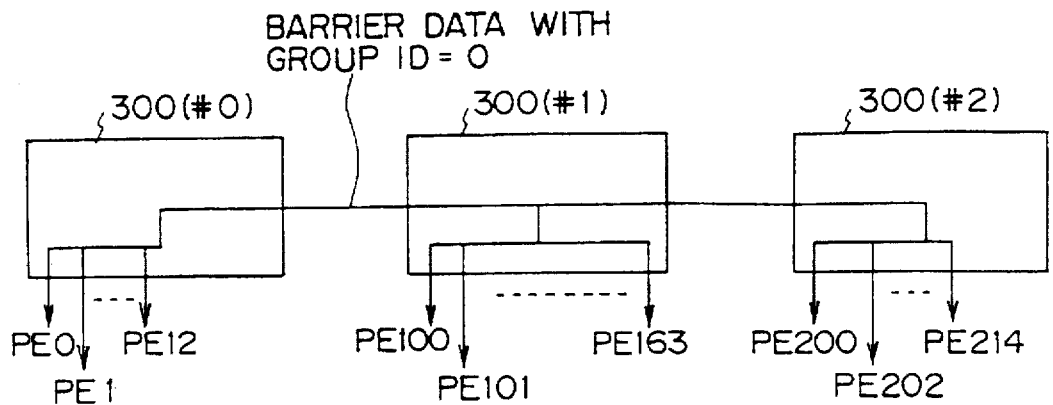
FIG. 30 is a diagram for use in explanation of how to broadcast barrier data in the data parallel processing system shown in FIG. 27.

Thus, the barrier data produced by the #0 networking device 300 will be supplied to all the processing elements within the system as shown in FIG. 30 according to operations T1 to T3.

(T4) When the #0 networking device, which has been supplied with the parent command from the service processor 100, terminates the transfer of the barrier data produced by it to its associated processing elements and its adjacent downstream #1 networking device, it transfers that parent command held in it to the adjacent downstream #1 networking device at the proper time via a command transfer line not shown.

(T5) Upon receipt of the parent command, the #1 networking device performs the same processing as the #0 networking device. The same operations as the above operations T1 to T3 associated with the #0 networking device are now performed with the #1 networking device as a starting point.

Figure 31:
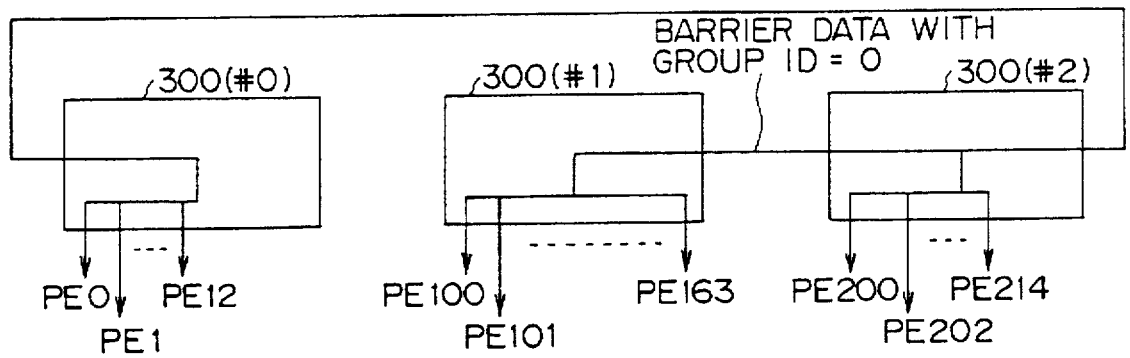
FIG. 31 is a diagram for use in explanation of how to broadcast barrier data in the data parallel processing system shown in FIG. 27.

Thus, the barrier data for group ID=0 will be supplied to all the processing elements within the system as shown in FIG. 31.

(T6) The same processing as T4 is now performed by the #1 networking device, so that the #2 networking device receives the parent command. Thus, the same operations as the above operations T1 to T3 are performed with the #2 networking device as a starting point.

Figure 32:
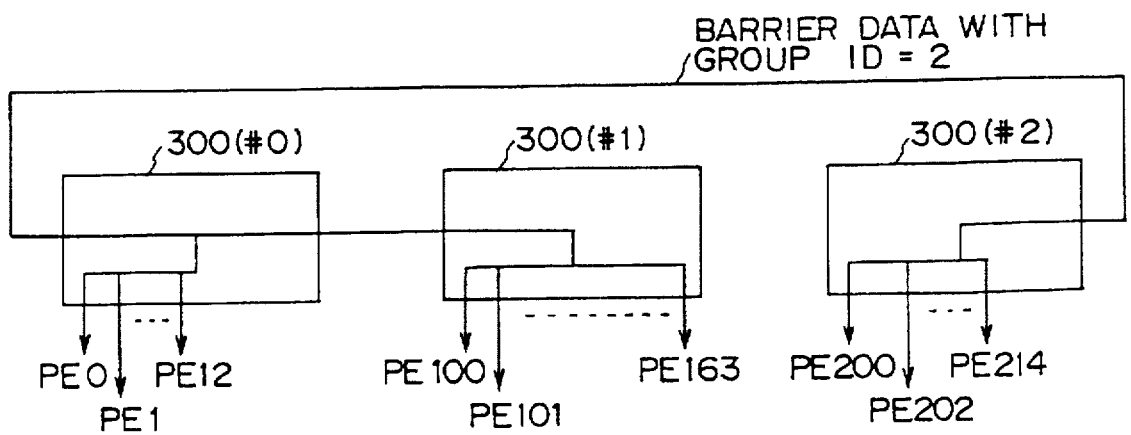
FIG. 32 is a diagram for use in explanation of how to broadcast barrier data in the data parallel processing system shown in FIG. 27.

As a result, the barrier data for group ID=2 will be applied to all the processing elements within the system as shown in FIG. 32.

After that, the same operations are repeated. That is, serial data headed by barrier data produced by the group ID=0 networking device and ended by barrier data produced by the group ID=2 networking device is supplied repeatedly to all the processing elements during system operation.

In the above example, three networking devices are interconnected in a loop configuration. The present invention is applicable to a system in which a number n (=2) of networking devices are interconnected in a loop configuration. In this case, serial data headed by barrier data produced by the group ID=0 networking device and ended by barrier data produced by the group ID=n−1 networking device is repeatedly supplied to all the processing elements within the system.

In the networking device (40, 140, or 240), group ID information in barrier data is set by the barrier synchronization control circuit (60, 160, or 260). For example, this setting is performed in the following way. That is, each barrier synchronization control circuit is equipped with an ID register (not shown) which holds a group ID value. The selector 65 receives the group ID value from the ID register, then inserts it immediately after the all-logic-one leading data for subsequent application to the register 68 and the parity bit generator 66. The parity bit generator 66 generates a parity bit for the group ID value and outputs it to the selector 68. The selector 68 inserts that parity bit and a logic "0" bit after the group ID value and sends the resulting data to the line terminal (d-1).

Although each networking device in the above embodiments is equipped with only one barrier synchronization control circuit, the provision of plural synchronization control circuits in each networking device is also permitted. In this case, processing elements will be connected to each barrier synchronization control circuit by a separate serial transfer line (corresponding to the serial transfer line 22 in FIG. 6). Each barrier synchronization control circuit produces and transfers barrier data in accordance with its respective individual timing of data transfer. In interconnecting the networking devices, barrier synchronization control circuits in each networking device are connected to barrier synchronization control circuits in its adjacent networking device by the same number of serial transfer lines (310) as the barrier synchronization control circuits.

Such a system will be described taking by way of example a system in which four networking devices (40, 140, or 240) are interconnected in a loop configuration, and each networking device has three barrier synchronization control circuits (60, 160, or 260).

Figure 33:
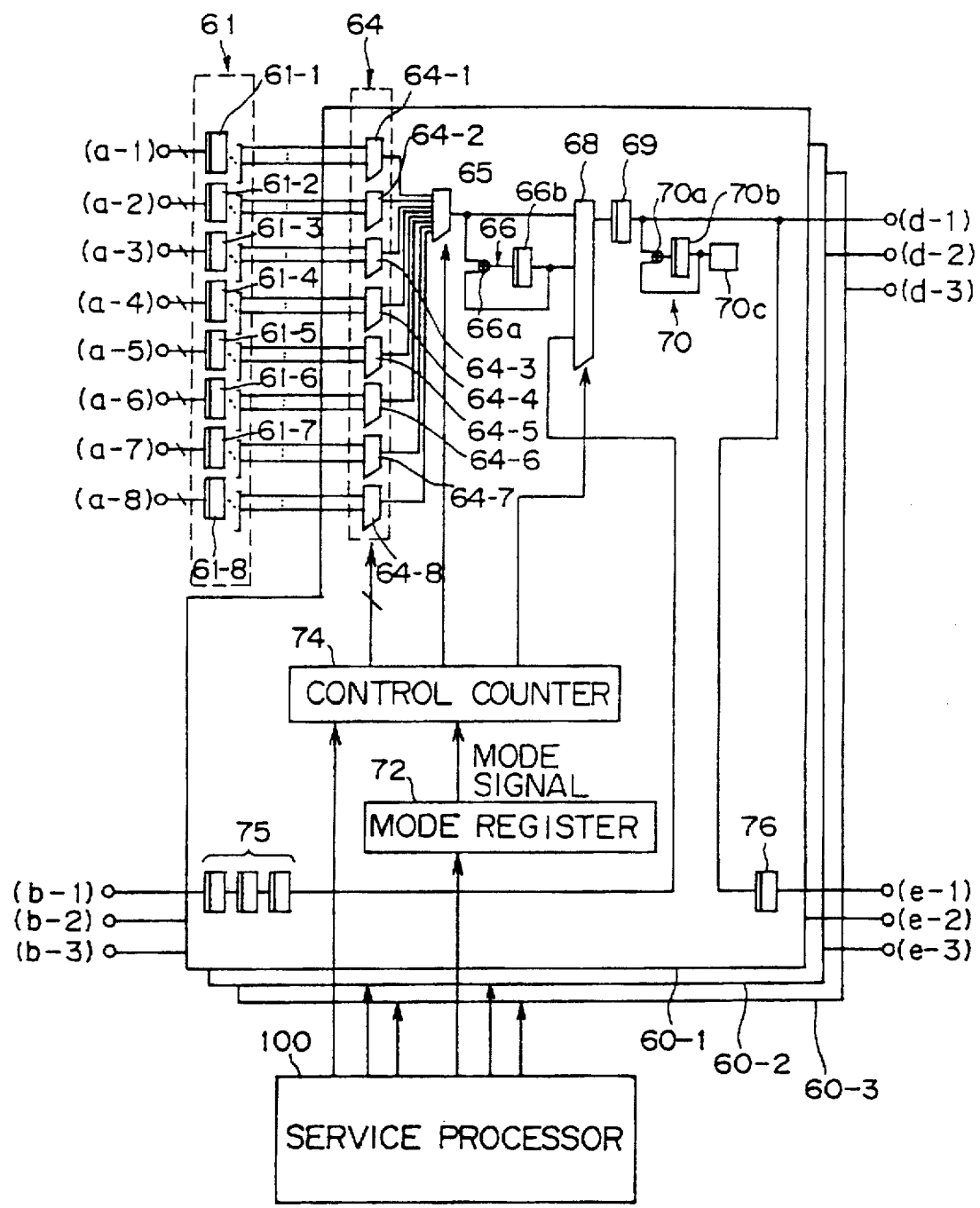
FIG. 33 shows an example of a partial circuit of a networking device having three barrier synchronization control circuits.

FIG. 33 shows a partial circuit in one of four networking devices 40 interconnected in the way shown in FIG. 11. In this case, each networking device is equipped with a circuit for data transfer in addition to the partial circuit of FIG. 33.

The partial circuit of FIG. 33 is provided with three circuits each of which has registers 75 and 76 added to the barrier synchronization control circuit 60 of FIG. 13. Three barrier synchronization control circuits 60-1, 60-2 and 60-3 are each connected to the service processor 100.

In FIG. 33, the same reference numerals as those in FIG. 13 are used to denote corresponding components having the same functions. The registers 75 latch serial data entered from a line terminal (b-1) and outputs it to the selector 68. The register 76 latches each bit of serial data output from the register 69 in sequence and outputs it to a line terminal (e-1).

Like the line terminal (d-1), line terminals (d-2) and (d-3) are used to send serial data to 64 processing elements under the control of the networking device. The line terminals (b-1), (b-2) and (b-3) are adapted to receive serial data from the adjacent upstream networking device, while the line terminals (e-1), (e-2) and (e-3) are adapted to send serial data to the adjacent downstream networking device.

The line terminals (b-1) and (e-1) are associated with a serial transfer line L1, the line terminals (b-2) and (e-2) are associated with a serial transfer line L2, and the line terminals (b-3) and (e-3) are associated with a serial transfer line L3.

Figure 34:
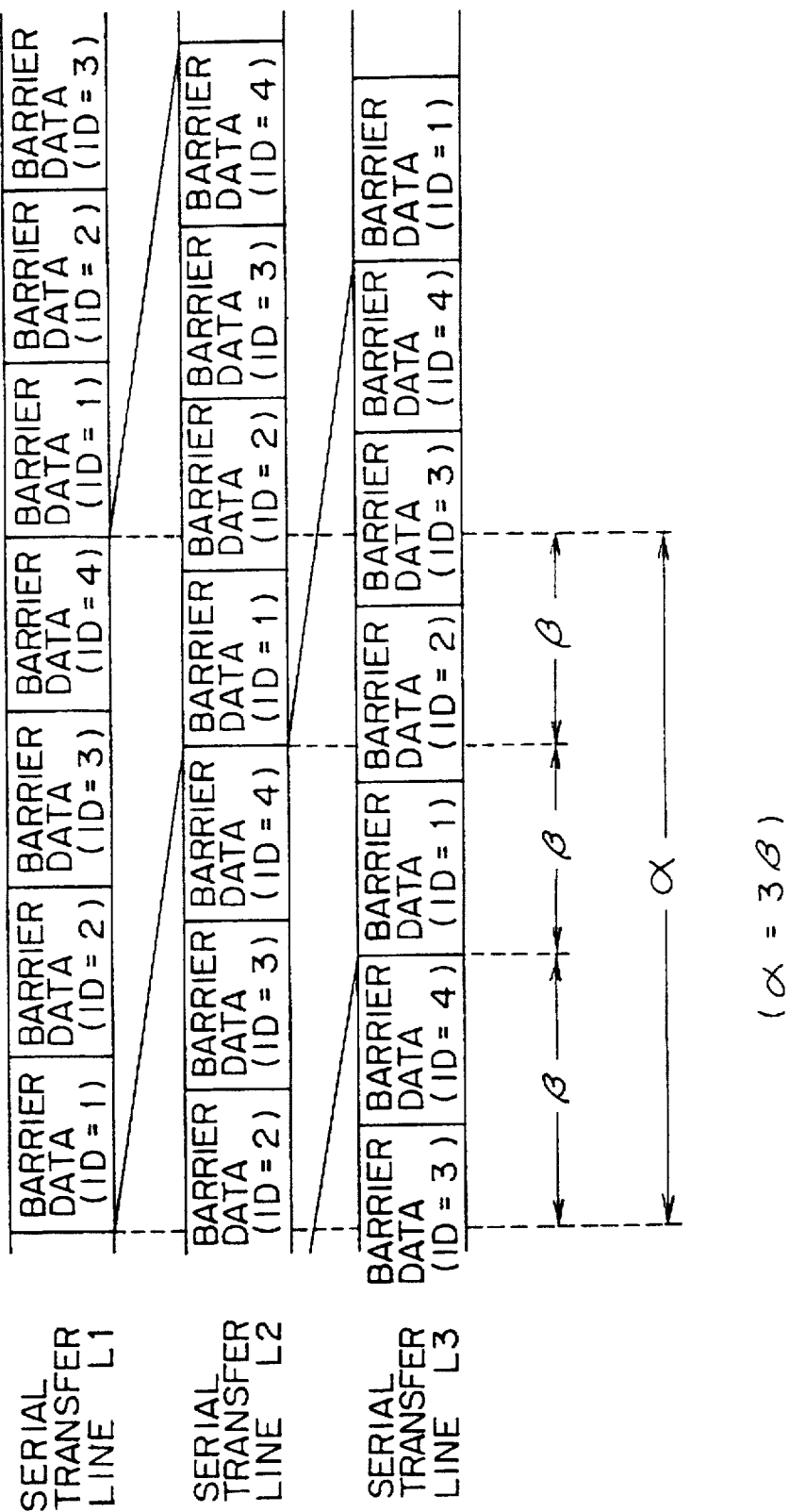
FIG. 34 is a diagram for use in explanation of how to transfer barrier data in a data parallel processing system equipped with four networking devices each having three barrier synchronization control circuits.
Figure 35:
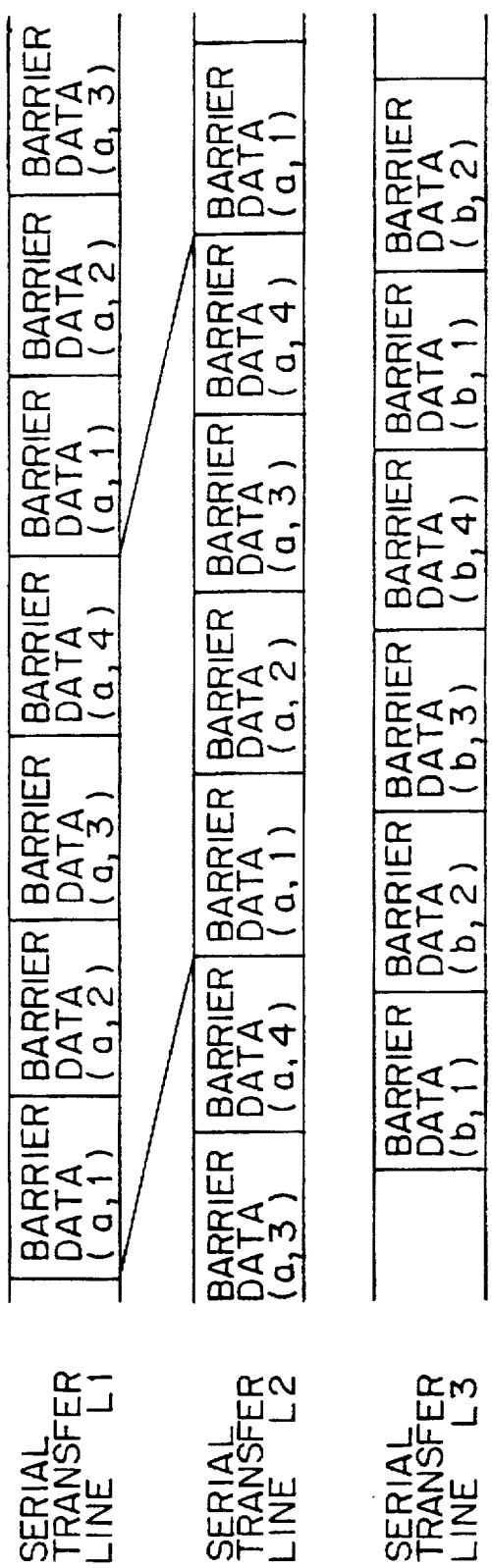
FIG. 35 is a diagram for use in explanation of how to transfer barrier data in a data parallel processing system that executes tasks a and b on a time-sharing basis.

In such a system, barrier data transfers are controlled in such a way as to shift a starting time to transfer four consecutive sets of barrier data on each of the serial transfer lines L1, L2 and L3 in turn by a time interval, preferably by two-thirds of a cycle of the consecutive sets of barrier data as shown in FIG. 34. By doing so, a cycle of barrier data, which was transferred to each processing element at intervals of a in the case where a single barrier synchronization control circuit is used, will be transferred to each processing element at intervals of $\beta(=\alpha/3)$. For example, during the first interval of $\beta$ in FIG. 34, the entire ID=1 barrier data set and the first one-third parts of the ID=2 barrier data set are transferred over the serial transfer line L1, the latter two-third parts of the ID=2 barrier data set and the first two-third parts of the ID=3 barrier data set are transferred over the serial transfer line L2, and the latter one-third parts of the ID=3 barrier data set and the entire ID=4 barrier data set are transferred over the serial transfer line L3. In other words, four different barrier data sets (ID=1, 2, 3, 4) are simultaneously transferred during an interval of $\beta$. During the second and following intervals of $\beta$, all information is likewise transferred. Thus, it becomes possible to increase the speed with which constantly updated data processing progress information for all the processing elements is transferred to each processing element.

When processing elements time-share plural tasks, each of multiple barrier synchronization control circuits can operate to produce barrier data for one of different tasks. For two tasks a and b by way of example, barrier data for the task a is transferred over the serial transfer lines L1 and L2, while barrier data for the task b is transferred over the serial transfer line L3.

The present invention is not limited to the above embodiments. For example, the number of processing elements, the number of serial transfer lines, and the formats of barrier data described herein are therefore illustrative and not restrictive.

As described above, the present invention, which is directed to a data parallel processing system in which processing elements are connected to an interconnection device, enables the format of serial data for barrier synchronization to be broadcasted to each processing element to be varied according to the number of processing elements actually connected to the interconnection device and the placement and configuration thereof, thus speeding up the transfer of the serial data. Thereby, each processing element is permitted to perform barrier synchronization faster, permitting parallel processing to be speeded up. The present invention is especially adapted to speed up barrier synchronization in a system in which a small number of processors are connected to a networking device.

What is claimed is:

1. A data parallel processing system comprising:
   processing elements, each of said processing elements producing data processing progress information indicating a progress of data processing by each of said processing elements; and an interconnection device broadcasting serial data, which contain the data processing progress information of each of said processing elements, to another processing element, said processing elements executing parallel processing in groups based on the serial data, said interconnection device including:

entry means for receiving and storing the data processing progress information;

producing means for obtaining the data processing progress information, for determining a format of the serial data based on placement and configuration information regarding which of said processing elements are currently connected to said interconnection device, and for producing the serial data; and broadcasting means for broadcasting the serial data to other(s) of said processing elements connected to said interconnection device via a serial transfer line, and each of said processing elements including:

holding means for holding the serial data management means for storing management information, for said processing elements allotted for the parallel processing, with each of said processing elements;

judgment means for judging the progress of the data processing using the serial data held in said holding means and the management information stored in said management means;

computing means for performing a computation for the data processing and for determining a timing at which a next data processing is started according to a result of a judgment by said judgment means; and notification means for sending the data processing progress information indicating a termination of the data processing by each of said processing elements to said interconnection device according to an instruction by said computing means.

2. The data parallel processing system according to claim 1, wherein said producing means produces the serial data based on the placement and the configuration of said processing elements that are currently connected to said interconnection device and are placed in a ready state.

3. The data parallel processing system according to claim 1, wherein said producing means includes mode information holding means for holding mode information specifying the format of the serial data and determining the format of the serial data based on the mode information.

4. The data parallel processing system according to claim 3, further comprising setting means provided outside said interconnection device for setting the mode information.

5. The data parallel processing system according to claim 4, wherein said setting means comprises a service processor.

6. The data parallel processing system according to claim 3, further comprising a DIP switch mounted on said interconnection device for setting the mode information.

7. The data parallel processing system according to claim 3, wherein said processing elements are allocated device numbers that are determined according to respective locations where said processing elements are connected to said interconnection device, and the mode information depends on a greatest device number.

8. The data parallel processing system according to claim 3, wherein said producing means determines a length of the serial data according to the mode information.

9. The data parallel processing system according to claim 1, wherein said producing means includes configuration information holding means for holding configuration information on said processing elements and said producing means determines the format of the serial data according to the configuration information.

10. The data parallel processing system according to claim 9, further comprising setting means provided outside said interconnection device for setting the configuration information.

11. The data parallel processing system according to claim 10, wherein said setting means comprises a service processor.

12. The data parallel processing system according to claim 9, further comprising a DIP switch mounted on said interconnection device for setting the configuration information.

13. The data parallel processing system according to claim 9, wherein said processing elements are allocated device numbers that are determined according to respective locations where said processing elements are connected to said interconnection device, and said producing means identifies a greatest device number from the configuration information and determines a length of the serial data according to the greatest device number.

14. The data parallel processing system according to claim 13, wherein said judgment means of each of said processing elements includes register means for holding information similar to the configuration information and refers to the information held in said register means for judging the progress of data processing.

15. A data parallel processing system, comprising:

first and second serial transfer lines;

first, second and third interconnection devices adjacent to each other and said first and second interconnection devices connected by said second serial transfer line; and a first part of processing elements, each of said first part of processing elements entering data processing progress information indicating a progress of respective data processing into said first interconnection device via said first serial transfer line, said first interconnection device broadcasting serial data which contain data processing progress information of said first part of said processing elements to each of said first part of said processing elements via said first serial transfer line and transferring the serial data to said second interconnection device via said second serial transfer line, each of said processing elements executing parallel processing in groups based on the serial data, said first interconnection device including:

entry means for receiving and storing the data processing progress information sent from each of said first part of processing elements via said first serial transfer line;

producing means for determining a format of the serial data to be broadcasted to others of said first part of processing elements based on placement and configuration information regarding which of said first part of said processing elements are currently connected to said first interconnection device, and for producing the serial data;

first broadcasting means for broadcasting the serial data produced by said producing means to the others of said first part of said processing elements via said first serial transfer line;

first transfer means for transferring the serial data produced by said producing means to said second interconnection device via said second serial transfer line;

second transfer means for transferring the serial data sent from said third interconnection device adjacent to said second interconnection device; and second broadcasting means for broadcasting the serial data sent from said third interconnection device to each of said first part of said processing elements, and said each of said first part of said processing elements including:

holding means for holding the serial data received through said first serial transfer line;

management means for storing management information, for said processing elements allotted for the parallel processing, with each of said first part of said processing elements;

judgment means for judging the progress of the data processing using the serial data held in said holding means and the management information stored in said management means;

computing means for performing a computation for the data processing and for determining a timing at which a next data processing is started according to a result of a judgment by said judgment means; and notification means for sending the data processing progress information indicating a termination of the data processing by each of said first part of said processing elements to said first interconnection device via said first serial transfer line according to an instruction by said computing means.

16. The data parallel processing system according to claim 15, wherein said producing means produces the serial data based on the placement and the configuration of processing elements currently connected to said first interconnection device and placed in a ready state.

17. An interconnection device for broadcasting serial data containing data processing progress information indicating a progress of data processing by a plurality of processing elements, to said processing elements, comprising:

entry means for storing the data processing progress information sent from each of said processing elements;

producing means for determining a format of the serial data based on placement and configuration information regarding which of said processing elements are coupled to said interconnecting device, and for producing the serial data from the data processing progress information for each of said processing elements in said entry means; and broadcasting means for broadcasting the serial data to said processing elements.

18. A data parallel processing system comprising:

processing elements, each of said processing elements receiving serial data containing data processing progress information indicating a progress of data processing by another of said processing elements and executing parallel processing based on the serial data, each of said processing elements including:

holding means for holding the serial data based on a placement and a configuration of said processing elements;

management means for storing management information, about said processing elements that perform the parallel processing with each of said processing elements;

judgment means for judging a progress of the data processing using the management information;

computing means for performing a computation for the data processing and for determining a timing at which a next data processing is started; and notification means for outputting the data processing progress information indicating a termination of the data processing by each of said processing elements according to an instruction by said computing means.

19. A data parallel processing method for a plurality of processing elements divided into groups, to perform data processing in parallel in one of the groups, comprising the steps of:

receiving the data processing progress information from each of the plurality of processing elements;

maintaining the data processing progress information received;

determining a format of the serial data based on configuration information regarding which of the plurality of processing elements are coupled to an interconnecting device;

producing the serial data based on the data processing progress information maintained; and broadcasting the serial data to the plurality of processing elements.

20. A barrier synchronization system for parallel processing, comprising:

processing elements to generate data processing progress information; and an interconnecting device coupled to said processing elements, to receive the data processing progress information, to determine a format of serial data based on configuration information regarding which of said processing elements are coupled to said interconnecting device, to generate said serial data based on both the data processing progress information and the format, and to send the serial data to said processing elements, said processing elements determining barrier synchronization for the parallel processing based on the serial data.

21. A barrier synchronization system as recited in claim 20, wherein said interconnecting device detects the configuration of said processing elements.

* * * * *

UNITED STATES PATENT AND TRADEMARK OFFICE
CERTIFICATE OF CORRECTION

PATENT NO. : 5,765,009
DATED : June 9, 1998
INVENTOR(S) : Ishizaka

It is certified that error appears in the above-identified patent and that said Letters Patent is hereby corrected as shown below:

Col. 2, line 26, after "group.", NO NEW PARAGRAPH [Continue with line 27 "Likewise, the..."].

Col. 21, line 11, change "(=2)" to --(≥2)--.

Col. 23, line 21, change "data" to --data;--.

Signed and Sealed this

Twenty-third Day of February, 1999

Q. TODD DICKINSON

Attest:

Attesting Officer

Acting Commissioner of Patents and Trademarks